(12) United States Patent
Baptist et al.

(10) Patent No.: US 11,966,285 B2
(45) Date of Patent: *Apr. 23, 2024

(54) RESOLVING STORAGE INCONSISTENCIES FOR A SET OF ENCODED DATA SLICES

(71) Applicant: Pure Storage, Inc., Mountain View, CA (US)

(72) Inventors: Andrew D. Baptist, Mt. Pleasant, WI (US); Ravi V. Khadiwala, Bartlett, IL (US); Jason K. Resch, Warwick, RI (US)

(73) Assignee: Pure Storage, Inc., Mountain View, CA (US)

( * ) Notice: Subject to any disclaimer, the term of this patent is extended or adjusted under 35 U.S.C. 154(b) by 20 days.

This patent is subject to a terminal disclaimer.

(21) Appl. No.: 16/974,367

(22) Filed: Oct. 19, 2021

(65) Prior Publication Data

US 2022/0091925 A1    Mar. 24, 2022

Related U.S. Application Data

(63) Continuation of application No. 16/517,747, filed on Jul. 22, 2019, now Pat. No. 11,226,860, which is a (Continued)

(51) Int. Cl.
*G06F 21/60* (2013.01)
*G06F 11/10* (2006.01)
(Continued)

(52) U.S. Cl.
CPC ...... *G06F 11/1004* (2013.01); *G06F 11/1076* (2013.01); *G06F 11/1092* (2013.01);
(Continued)

(58) Field of Classification Search
CPC ............ G06F 11/1004; G06F 11/1076; G06F 11/1092; G06F 11/1096; G06F 21/602;
(Continued)

(56) References Cited

U.S. PATENT DOCUMENTS 4,092,732 A   5/1978  Ouchi
5,454,101 A   9/1995  Mackay
(Continued)

OTHER PUBLICATIONS

Chung; An Automatic Data Segmentation Method for 3D Measured Data Points; National Taiwan University; pp. 1-8; 1998.
(Continued)

*Primary Examiner* — Vance M Little
(74) *Attorney, Agent, or Firm* — Garlick & Markison; Timothy D. Taylor

(57) ABSTRACT

A method includes determining, by a computing device of a storage network, a storage inconsistency exists for a set of encoded data slices based on an indicator of a difference list, where the difference list is regarding storage of the set of encoded data slices within a set of storage units of the storage network and where a data segment is error encoded into the set of encoded data slices. The method further includes determining a storage resolution of a plurality of storage resolutions for the storage inconsistency based on the one or more indicators. The method further includes facilitating the storage resolution to resolve the storage inconsistency for the set of encoded data slices.

20 Claims, 15 Drawing Sheets

Related U.S. Application Data continuation-in-part of application No. 15/249,905, filed on Aug. 29, 2016, now Pat. No. 10,360,097, which is a continuation of application No. 14/256,472, filed on Apr. 18, 2014, now Pat. No. 9,432,341.

(60) Provisional application No. 61/828,905, filed on May 30, 2013.

(51) Int. Cl.
| | |
|---|---|
| *G06F 21/80* | (2013.01) |
| *H04L 9/40* | (2022.01) |
| *H04L 67/1097* | (2022.01) |
| *H04L 69/14* | (2022.01) |
| *G06F 11/20* | (2006.01) |
| *H04L 1/00* | (2006.01) |

(52) U.S. Cl.
CPC ........ *G06F 11/1096* (2013.01); *G06F 21/602* (2013.01); *G06F 21/80* (2013.01); *H04L 63/0457* (2013.01); *H04L 63/061* (2013.01); *H04L 63/062* (2013.01); *H04L 67/1097* (2013.01); *H04L 69/14* (2013.01); *G06F 11/2094* (2013.01); *G06F 2211/1028* (2013.01); *G06F 2221/2107* (2013.01); *H04L 1/0042* (2013.01); *H04L 1/0047* (2013.01)

(58) Field of Classification Search
CPC ... G06F 21/80; G06F 11/2094; H04L 67/1097
See application file for complete search history.

(56) References Cited

U.S. PATENT DOCUMENTS

| | | | |
|---|---|---|---|
| 5,485,474 A | 1/1996 | Rabin | |
| 5,774,643 A | 6/1998 | Lubbers | |
| 5,802,364 A | 9/1998 | Senator | |
| 5,809,285 A | 9/1998 | Hilland | |
| 5,890,156 A | 3/1999 | Rekieta | |
| 5,987,622 A | 11/1999 | Lo Verso | |
| 5,991,414 A | 11/1999 | Garay | |
| 6,012,159 A | 1/2000 | Fischer | |
| 6,058,454 A | 5/2000 | Gerlach | |
| 6,128,277 A | 10/2000 | Bruck | |
| 6,175,571 B1 | 1/2001 | Haddock | |
| 6,192,472 B1 | 2/2001 | Garay | |
| 6,256,688 B1 | 7/2001 | Suetaka | |
| 6,272,658 B1 | 8/2001 | Steele | |
| 6,301,604 B1 | 10/2001 | Nojima | |
| 6,356,949 B1 | 3/2002 | Katsandres | |
| 6,366,995 B1 | 4/2002 | Vilkov | |
| 6,374,336 B1 | 4/2002 | Peters | |
| 6,415,373 B1 | 7/2002 | Peters | |
| 6,418,539 B1 | 7/2002 | Walker | |
| 6,449,688 B1 | 9/2002 | Peters | |
| 6,567,948 B2 | 5/2003 | Steele | |
| 6,571,282 B1 | 5/2003 | Bowman-Amuah | |
| 6,609,223 B1 | 8/2003 | Wolfgang | |
| 6,718,361 B1 | 4/2004 | Basani | |
| 6,760,808 B2 | 7/2004 | Peters | |
| 6,785,768 B2 | 8/2004 | Peters | |
| 6,785,783 B2 | 8/2004 | Buckland | |
| 6,826,711 B2 | 11/2004 | Moulton | |
| 6,879,596 B1 | 4/2005 | Dooply | |
| 7,003,688 B1 | 2/2006 | Pittelkow | |
| 7,024,451 B2 | 4/2006 | Jorgenson | |
| 7,024,609 B2 | 4/2006 | Wolfgang | |
| 7,080,101 B1 | 7/2006 | Watson | |
| 7,103,824 B2 | 9/2006 | Halford | |
| 7,103,915 B2 | 9/2006 | Redlich | |
| 7,111,115 B2 | 9/2006 | Peters | |
| 7,140,044 B2 | 11/2006 | Redlich | |
| 7,146,644 B2 | 12/2006 | Redlich | |
| 7,171,493 B2 | 1/2007 | Shu | |
| 7,222,133 B1 | 5/2007 | Raipurkar | |
| 7,240,236 B2 | 7/2007 | Cutts | |
| 7,272,613 B2 | 9/2007 | Sim | |
| 7,636,724 B2 | 12/2009 | De La Torre | |
| 9,049,011 B1 | 6/2015 | Agrawal | |
| 2002/0062422 A1 | 5/2002 | Butterworth | |
| 2002/0166079 A1 | 11/2002 | Ulrich | |
| 2003/0005285 A1 | 1/2003 | Graunke | |
| 2003/0018927 A1 | 1/2003 | Gadir | |
| 2003/0037261 A1 | 2/2003 | Meffert | |
| 2003/0065617 A1 | 4/2003 | Watkins | |
| 2003/0084020 A1 | 5/2003 | Shu | |
| 2004/0024963 A1 | 2/2004 | Talagala | |
| 2004/0122917 A1 | 6/2004 | Menon | |
| 2004/0215998 A1 | 10/2004 | Buxton | |
| 2004/0228493 A1 | 11/2004 | Ma | |
| 2005/0100022 A1 | 5/2005 | Ramprashad | |
| 2005/0114594 A1 | 5/2005 | Corbett | |
| 2005/0125593 A1 | 6/2005 | Karpoff | |
| 2005/0131993 A1 | 6/2005 | Fatula | |
| 2005/0132070 A1 | 6/2005 | Redlich | |
| 2005/0144382 A1 | 6/2005 | Schmisseur | |
| 2005/0229069 A1 | 10/2005 | Hassner | |
| 2006/0047907 A1 | 3/2006 | Shiga | |
| 2006/0136448 A1 | 6/2006 | Cialini | |
| 2006/0156059 A1 | 7/2006 | Kitamura | |
| 2006/0224603 A1 | 10/2006 | Correll, Jr. | |
| 2007/0079081 A1 | 4/2007 | Gladwin | |
| 2007/0079082 A1 | 4/2007 | Gladwin | |
| 2007/0079083 A1 | 4/2007 | Gladwin | |
| 2007/0088970 A1 | 4/2007 | Buxton | |
| 2007/0174192 A1 | 7/2007 | Gladwin | |
| 2007/0214285 A1 | 9/2007 | Au | |
| 2007/0234110 A1 | 10/2007 | Soran | |
| 2007/0283167 A1 | 12/2007 | Venters, III | |
| 2009/0094251 A1 | 4/2009 | Gladwin | |
| 2009/0094318 A1 | 4/2009 | Gladwin | |
| 2010/0023524 A1 | 1/2010 | Gladwin | |
| 2011/0029836 A1* | 2/2011 | Dhuse | G06F 11/08 714/752 |
| 2011/0055903 A1* | 3/2011 | Leggette | H04L 63/0884 726/4 |
| 2011/0216901 A1 | 9/2011 | Kiyomoto | |
| 2011/0225362 A1 | 9/2011 | Leggette | |
| 2012/0166813 A1 | 6/2012 | Grube | |
| 2013/0346809 A1* | 12/2013 | Kazi | G06F 11/1068 714/48 |
| 2014/0040417 A1 | 2/2014 | Gladwin | |
| 2014/0115346 A1 | 4/2014 | Ekberg | |

OTHER PUBLICATIONS

Harrison; Lightweight Directory Access Protocol (LDAP): Authentication Methods and Security Mechanisms; IETF Network Working Group; RFC 4513; Jun. 2006; pp. 1-32.

Kubiatowicz, et al.; OceanStore: An Architecture for Global-Scale Persistent Storage; Proceedings of the Ninth International Conference on Architectural Support for Programming Languages and Operating Systems (ASPLOS 2000); Nov. 2000; pp. 1-12.

Legg; Lightweight Directory Access Protocol (LDAP): Syntaxes and Matching Rules; IETF Network Working Group; RFC 4517; Jun. 2006; pp. 1-50.

Plank, T1: Erasure Codes for Storage Applications; FAST2005, 4th Usenix Conference on File Storage Technologies; Dec. 13-16, 2005; pp. 1-74.

Rabin; Efficient Dispersal of Information for Security, Load Balancing, and Fault Tolerance; Journal of the Association for Computer Machinery; vol. 36, No. 2; Apr. 1989; pp. 335-348.

Satran, et al.; Internet Small Computer Systems Interface (ISCSI); IETF Network Working Group; RFC 3720; Apr. 2004; pp. 1-257.

Sciberras; Lightweight Directory Access Protocol (LDAP): Schema for User Applications; IETF Network Working Group; RFC 4519; Jun. 2006; pp. 1-33.

Sermersheim; Lightweight Directory Access Protocol (LDAP): The Protocol; IETF Network Working Group; RFC 4511; Jun. 2006; pp. 1-68.

(56) References Cited

OTHER PUBLICATIONS

ShamirR; How to Share a Secret; Communications of the ACM; vol. 22, No. 11; Nov. 1979; pp. 612-613.
Smith; Lightweight Directory Access Protocol (LDAP): Uniform Resource Locator; IETF Network Working Group; RFC 4516; Jun. 2006; pp. 1-15.
Smith; Lightweight Directory Access Protocol (LDAP): String Representation of Search Filters; IETF Network Working Group; RFC 4515; Jun. 2006; pp. 1-12.
Wildi; Java iSCSi Initiator; Master Thesis; Department of Computer and Information Science, University of Konstanz; Feb. 2007; 60 pgs.
Xin, et al.; Evaluation of Distributed Recovery in Large-Scale Storage Systems; 13th IEEE International Symposium on High Performance Distributed Computing; Jun. 2004; pp. 172-181.
Zeilenga; Lightweight Directory Access Protocol (LDAP): Directory Information Models; IETF Network Working Group; RFC 4512; Jun. 2006; pp. 1-49.
Zeilenga; Lightweight Directory Access Protocol (LDAP): Internationalized String Preparation; IETF Network Working Group; RFC 4518; Jun. 2006; pp. 1-14.
Zeilenga; Lightweight Directory Access Protocol (LDAP): String Representation of Distinguished Names; IETF Network Working Group; RFC 4514; Jun. 2006; pp. 1-15.
Zeilenga; Lightweight Directory Access Protocol (LDAP): Technical Specification Road Map; IETF Network Working Group; RFC 4510; Jun. 2006; pp. 1-8.

\* cited by examiner

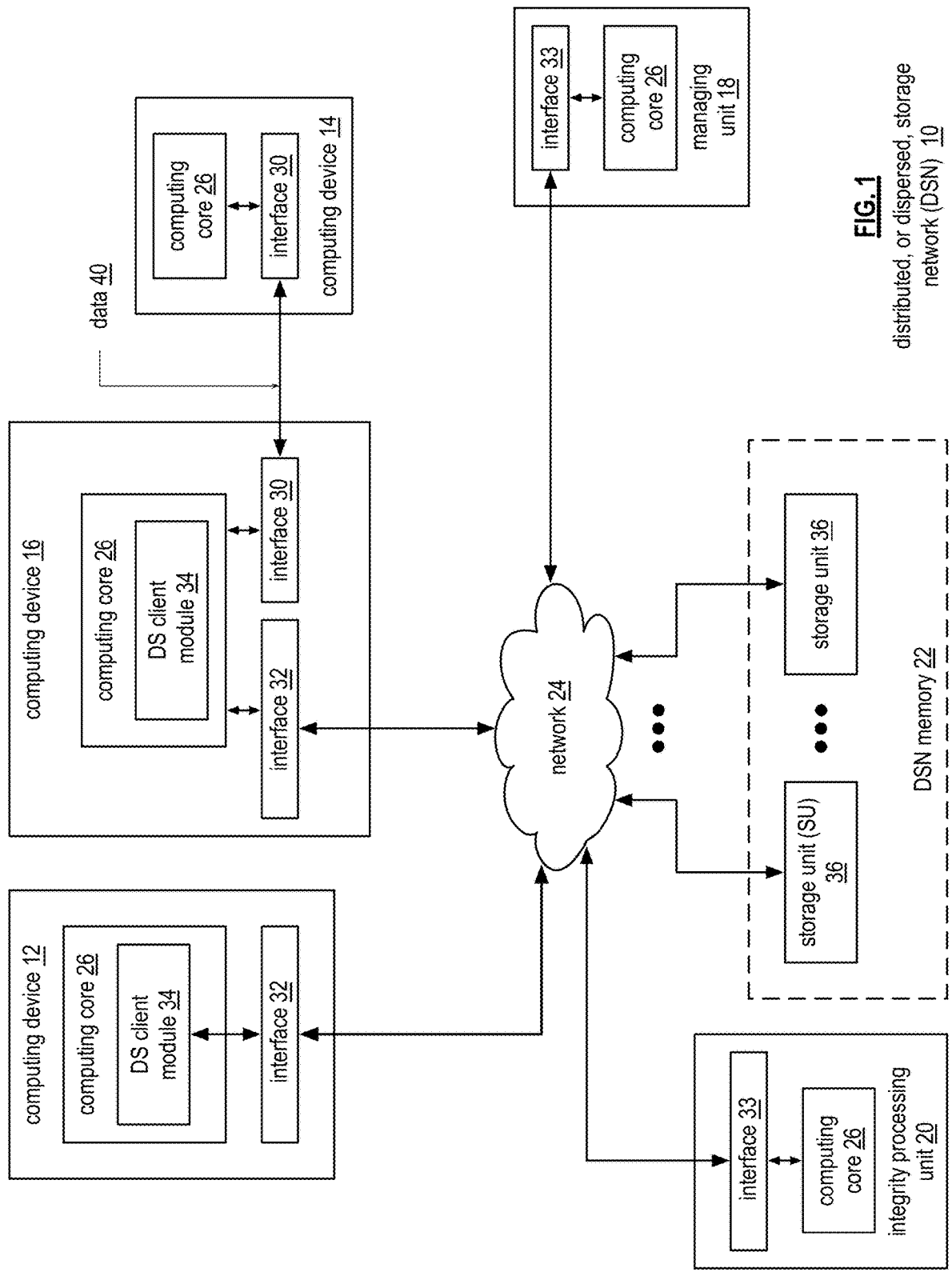

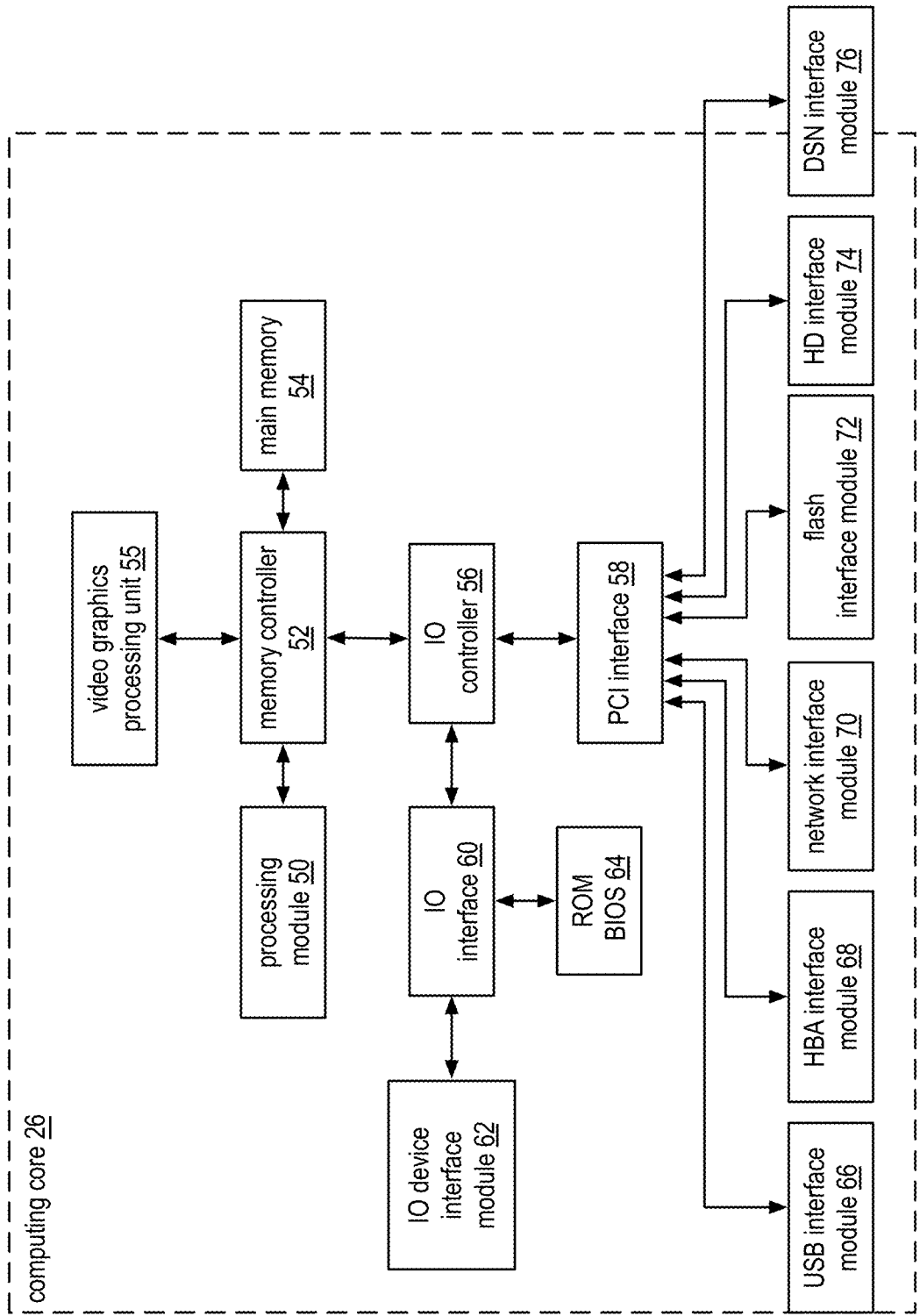

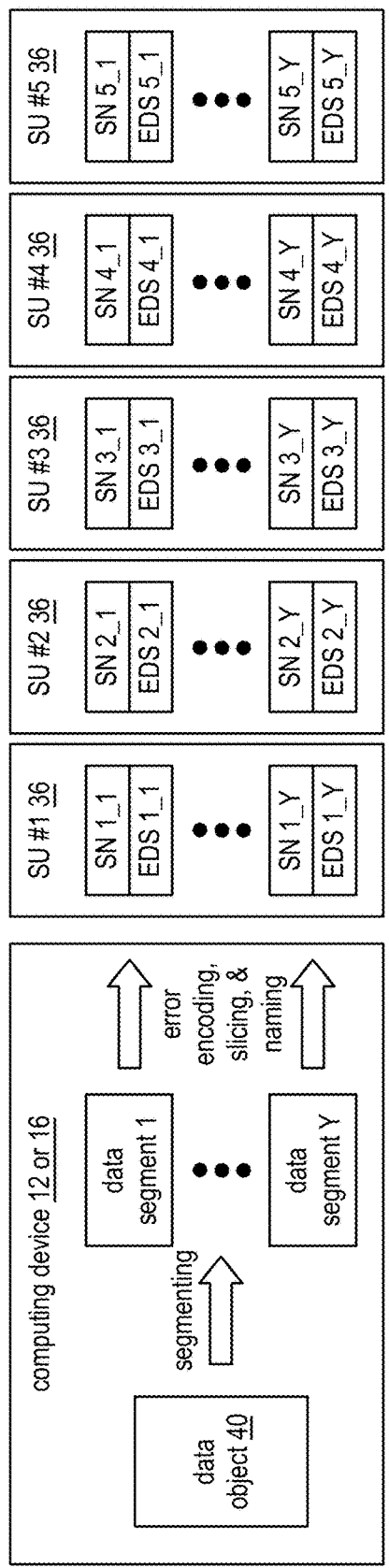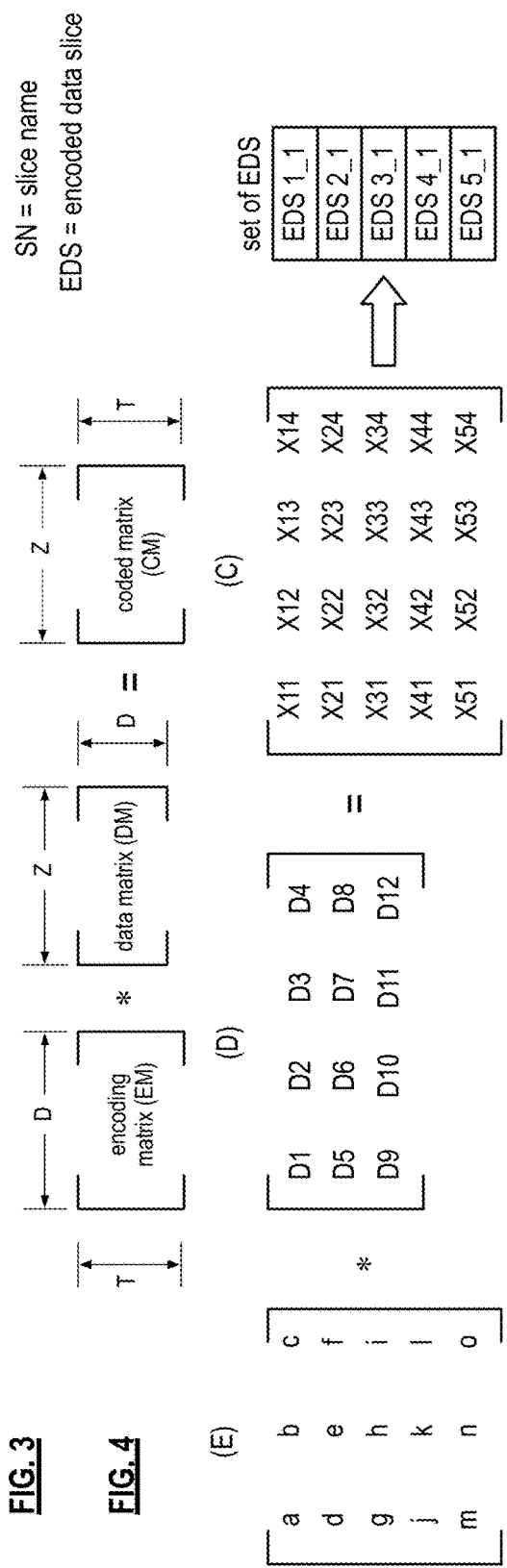

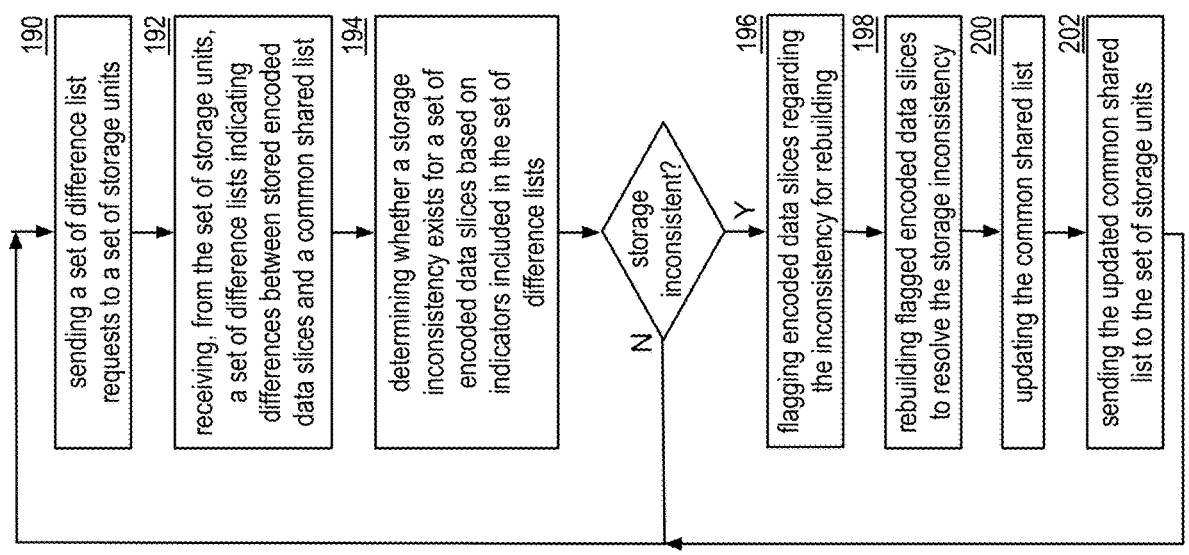

RESOLVING STORAGE INCONSISTENCIES FOR A SET OF ENCODED DATA SLICES

CROSS REFERENCE TO RELATED PATENTS

The present U.S. Utility patent application claims priority pursuant to 35 U.S.C. § 120 as a continuation of U.S. Utility application Ser. No. 16/517,747, entitled "Difference Based Rebuild List Scanning", filed Jul. 22, 2019, which is a continuation-in-part of U.S. Utility application Ser. No. 15/249,905, entitled "Securing Data In A Dispersed Storage Network", filed Aug. 29, 2016, issued as U.S. Pat. No. 10,360,097 on Jul. 23, 2019, which is a continuation of U.S. Utility application Ser. No. 14/256,472, entitled "Securing Data In A Dispersed Storage Network", filed Apr. 18, 2014, issued as U.S. Pat. No. 9,432,341 on Aug. 30, 2016, which claims priority pursuant to 35 U.S.C. § 119(e) to U.S. Provisional Application No. 61/828,905 entitled "Encrypted Zero Information Gain Data Rebuilding", filed May 30, 2013, all of which are hereby incorporated herein by reference in their entirety and made part of the present U.S. Utility patent application for all purposes

STATEMENT REGARDING FEDERALLY SPONSORED RESEARCH OR DEVELOPMENT

Not applicable.

INCORPORATION-BY-REFERENCE OF MATERIAL SUBMITTED ON A COMPACT DISC

Not applicable.

BACKGROUND OF THE INVENTION

Technical Field of the Invention

Description of Related Art

Computing devices are known to communicate data, process data, and/or store data. Such computing devices range from wireless smart phones, laptops, tablets, personal computers (PC), work stations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

As is further known, a computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function. For example, Hadoop is an open source software framework that supports distributed applications enabling application execution by thousands of computers.

In addition to cloud computing, a computer may use "cloud storage" as part of its memory system. As is known, cloud storage enables a user, via its computer, to store files, applications, etc. on an Internet storage system. The Internet storage system may include a RAID (redundant array of independent disks) system and/or a dispersed storage system that uses an error correction scheme to encode data for storage.

BRIEF DESCRIPTION OF THE SEVERAL VIEWS OF THE DRAWING(S)

FIG. 1 is a schematic block diagram of an embodiment of a dispersed or distributed storage network (DSN) in accordance with the present invention;

FIG. 2 is a schematic block diagram of an embodiment of a computing core in accordance with the present invention;

FIG. 3 is a schematic block diagram of an example of dispersed storage error encoding of data in accordance with the present invention;

FIG. 4 is a schematic block diagram of a generic example of an error encoding function in accordance with the present invention;

FIG. 5 is a schematic block diagram of a specific example of an error encoding function in accordance with the present invention;

FIG. 6 is a schematic block diagram of an example of a slice name of an encoded data slice (EDS) in accordance with the present invention;

FIG. 19 is a flowchart illustrating an example of a method of determining a storage inconsistency of one or more sets of encoded data slices in accordance with the present invention.

DETAILED DESCRIPTION OF THE INVENTION

Figure 7:
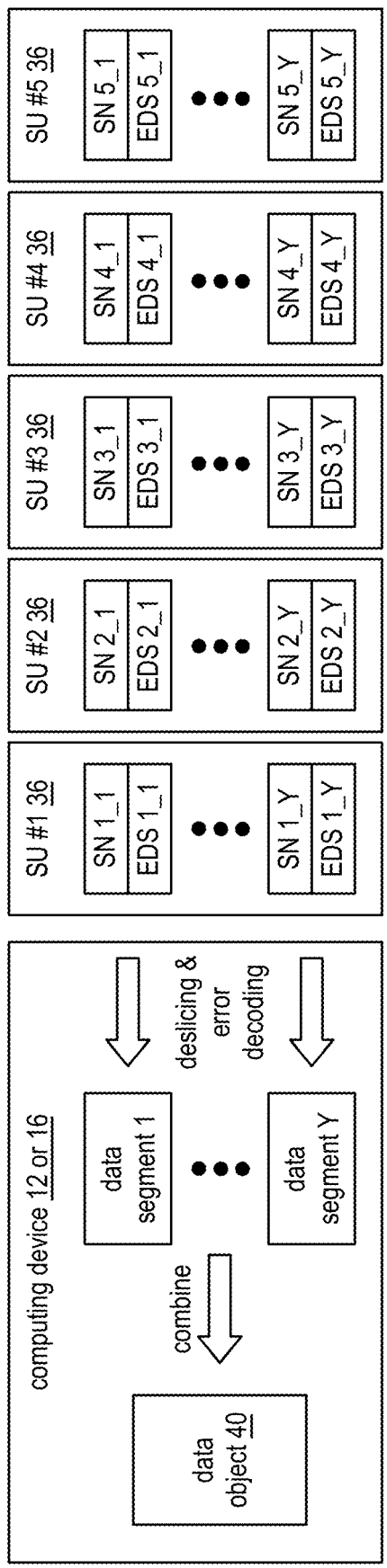
FIG. 7 is a schematic block diagram of an example of dispersed storage error decoding of data in accordance with the present invention.

FIG. 1 is a schematic block diagram of an embodiment of a dispersed, or distributed, storage network (DSN) 10 that includes a plurality of computing devices 12-16, a managing unit 18, an integrity processing unit 20, and a DSN memory 22. The components of the DSN 10 are coupled to a network 24, which may include one or more wireless and/or wire lined communication systems; one or more non-public intranet systems and/or public internet systems; and/or one or more local area networks (LAN) and/or wide area networks (WAN).

The DSN memory 22 includes a plurality of storage units 36 that may be located at geographically different sites (e.g., one in Chicago, one in Milwaukee, etc.), at a common site, or a combination thereof. For example, if the DSN memory 22 includes eight storage units 36, each storage unit is located at a different site. As another example, if the DSN memory 22 includes eight storage units 36, all eight storage units are located at the same site. As yet another example, if the DSN memory 22 includes eight storage units 36, a first pair of storage units are at a first common site, a second pair of storage units are at a second common site, a third pair of storage units are at a third common site, and a fourth pair of storage units are at a fourth common site. Note that a DSN memory 22 may include more or less than eight storage units 36. Further note that each storage unit 36 includes a computing core (as shown in FIG. 2, or components thereof) and a plurality of memory devices for storing dispersed error encoded data.

Each of the computing devices 12-16, the managing unit 18, and the integrity processing unit 20 include a computing core 26, which includes network interfaces 30-33. Computing devices 12-16 may each be a portable computing device and/or a fixed computing device. A portable computing device may be a social networking device, a gaming device, a cell phone, a smart phone, a digital assistant, a digital music player, a digital video player, a laptop computer, a handheld computer, a tablet, a video game controller, and/or any other portable device that includes a computing core. A fixed computing device may be a computer (PC), a computer server, a cable set-top box, a satellite receiver, a television set, a printer, a fax machine, home entertainment equipment, a video game console, and/or any type of home or office computing equipment. Note that each of the managing unit 18 and the integrity processing unit 20 may be separate computing devices, may be a common computing device, and/or may be integrated into one or more of the computing devices 12-16 and/or into one or more of the storage units 36.

Each interface 30, 32, and 33 includes software and hardware to support one or more communication links via the network 24 indirectly and/or directly. For example, interface 30 supports a communication link (e.g., wired, wireless, direct, via a LAN, via the network 24, etc.) between computing devices 14 and 16. As another example, interface 32 supports communication links (e.g., a wired connection, a wireless connection, a LAN connection, and/or any other type of connection to/from the network 24) between computing devices 12 & 16 and the DSN memory 22. As yet another example, interface 33 supports a communication link for each of the managing unit 18 and the integrity processing unit 20 to the network 24.

Computing devices 12 and 16 include a dispersed storage (DS) client module 34, which enables the computing device to dispersed storage error encode and decode data as subsequently described with reference to one or more of FIGS. 3-8. In this example embodiment, computing device 16 functions as a dispersed storage processing agent for computing device 14. In this role, computing device 16 dispersed storage error encodes and decodes data (e.g., data 40) on behalf of computing device 14. With the use of dispersed storage error encoding and decoding, the DSN 10 is tolerant of a significant number of storage unit failures (the number of failures is based on parameters of the dispersed storage error encoding function) without loss of data and without the need for a redundant or backup copies of the data. Further, the DSN 10 stores data for an indefinite period of time without data loss and in a secure manner (e.g., the system is very resistant to unauthorized attempts at accessing the data).

In operation, the managing unit 18 performs DS management services. For example, the managing unit 18 establishes distributed data storage parameters (e.g., vault creation, distributed storage parameters, security parameters, billing information, user profile information, etc.) for computing devices 12-14 individually or as part of a group of user devices. As a specific example, the managing unit 18 coordinates creation of a vault (e.g., a virtual memory block associated with a portion of an overall namespace of the DSN) within the DSN memory 22 for a user device, a group of devices, or for public access and establishes per vault dispersed storage (DS) error encoding parameters for a vault. The managing unit 18 facilitates storage of DS error encoding parameters for each vault by updating registry information of the DSN 10, where the registry information may be stored in the DSN memory 22, a computing device 12-16, the managing unit 18, and/or the integrity processing unit 20.

The DSN managing unit 18 creates and stores user profile information (e.g., an access control list (ACL)) in local memory and/or within memory of the DSN memory 22. The user profile information includes authentication information, permissions, and/or the security parameters. The security parameters may include encryption/decryption scheme, one or more encryption keys, key generation scheme, and/or data encoding/decoding scheme.

The DSN managing unit 18 creates billing information for a particular user, a user group, a vault access, public vault access, etc. For instance, the DS managing unit 18 tracks the number of times a user accesses a non-public vault and/or public vaults, which can be used to generate a per-access billing information. In another instance, the DS managing unit 18 tracks the amount of data stored and/or retrieved by a user device and/or a user group, which can be used to generate a per-data-amount billing information.

As another example, the managing unit 18 performs network operations, network administration, and/or network maintenance. Network operations includes authenticating user data allocation requests (e.g., read and/or write requests), managing creation of vaults, establishing authentication credentials for user devices, adding/deleting components (e.g., user devices, storage units, and/or computing devices with a DS client module 34) to/from the DSN 10, and/or establishing authentication credentials for the storage units 36. Network administration includes monitoring devices and/or units for failures, maintaining vault information, determining device and/or unit activation status, determining device and/or unit loading, and/or determining any other system level operation that affects the performance level of the DSN 10. Network maintenance includes facilitating replacing, upgrading, repairing, and/or expanding a device and/or unit of the DSN 10.

The integrity processing unit 20 performs rebuilding of 'bad' or missing encoded data slices. At a high level, the integrity processing unit 20 performs rebuilding by periodically attempting to retrieve/list encoded data slices, and/or slice names of the encoded data slices, from the DSN memory 22. For retrieved encoded slices, they are checked for errors due to data corruption, outdated version, etc. If a slice includes an error, it is flagged as a 'bad' slice. For encoded data slices that were not received and/or not listed, they are flagged as missing slices. Bad and/or missing slices are subsequently rebuilt using other retrieved encoded data slices that are deemed to be good slices to produce rebuilt slices. The rebuilt slices are stored in the DSN memory 22.

FIG. 2 is a schematic block diagram of an embodiment of a computing core 26 that includes a processing module 50, a memory controller 52, main memory 54, a video graphics processing unit 55, an input/output (TO) controller 56, a peripheral component interconnect (PCI) interface 58, an 10 interface module 60, at least one IO device interface module 62, a read only memory (ROM) basic input output system (BIOS) 64, and one or more memory interface modules. The one or more memory interface module(s) includes one or more of a universal serial bus (USB) interface module 66, a host bus adapter (HBA) interface module 68, a network interface module 70, a flash interface module 72, a hard drive interface module 74, and a DSN interface module 76.

The DSN interface module 76 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). The DSN interface module 76 and/or the network interface module 70 may function as one or more of the interface 30-33 of FIG. 1. Note that the IO device interface module 62 and/or the memory interface modules 66-76 may be collectively or individually referred to as IO ports.

FIG. 3 is a schematic block diagram of an example of dispersed storage error encoding of data. When a computing device 12 or 16 has data to store it disperse storage error encodes the data in accordance with a dispersed storage error encoding process based on dispersed storage error encoding parameters. The dispersed storage error encoding parameters include an encoding function (e.g., information dispersal algorithm, Reed-Solomon, Cauchy Reed-Solomon, systematic encoding, non-systematic encoding, on-line codes, etc.), a data segmenting protocol (e.g., data segment size, fixed, variable, etc.), and per data segment encoding values. The per data segment encoding values include a total, or pillar width, number (T) of encoded data slices per encoding of a data segment i.e., in a set of encoded data slices); a decode threshold number (D) of encoded data slices of a set of encoded data slices that are needed to recover the data segment; a read threshold number (R) of encoded data slices to indicate a number of encoded data slices per set to be read from storage for decoding of the data segment; and/or a write threshold number (W) to indicate a number of encoded data slices per set that must be accurately stored before the encoded data segment is deemed to have been properly stored. The dispersed storage error encoding parameters may further include slicing information (e.g., the number of encoded data slices that will be created for each data segment) and/or slice security information (e.g., per encoded data slice encryption, compression, integrity checksum, etc.).

In the present example, Cauchy Reed-Solomon has been selected as the encoding function (a generic example is shown in FIG. 4 and a specific example is shown in FIG. 5); the data segmenting protocol is to divide the data object into fixed sized data segments; and the per data segment encoding values include: a pillar width of 5, a decode threshold of 3, a read threshold of 4, and a write threshold of 4. In accordance with the data segmenting protocol, the computing device 12 or 16 divides the data (e.g., a file (e.g., text, video, audio, etc.), a data object, or other data arrangement) into a plurality of fixed sized data segments (e.g., 1 through Y of a fixed size in range of Kilo-bytes to Tera-bytes or more). The number of data segments created is dependent of the size of the data and the data segmenting protocol.

The computing device 12 or 16 then disperse storage error encodes a data segment using the selected encoding function (e.g., Cauchy Reed-Solomon) to produce a set of encoded data slices. FIG. 4 illustrates a generic Cauchy Reed-Solomon encoding function, which includes an encoding matrix (EM), a data matrix (DM), and a coded matrix (CM). The size of the encoding matrix (EM) is dependent on the pillar width number (T) and the decode threshold number (D) of selected per data segment encoding values. To produce the data matrix (DM), the data segment is divided into a plurality of data blocks and the data blocks are arranged into D number of rows with Z data blocks per row. Note that Z is a function of the number of data blocks created from the data segment and the decode threshold number (D). The coded matrix is produced by matrix multiplying the data matrix by the encoding matrix.

FIG. 5 illustrates a specific example of Cauchy Reed-Solomon encoding with a pillar number (T) of five and decode threshold number of three. In this example, a first data segment is divided into twelve data blocks (D1-D12). The coded matrix includes five rows of coded data blocks, where the first row of X11-X14 corresponds to a first encoded data slice (EDS 1_1), the second row of X21-X24 corresponds to a second encoded data slice (EDS 2_1), the third row of X31-X34 corresponds to a third encoded data slice (EDS 3_1), the fourth row of X41-X44 corresponds to a fourth encoded data slice (EDS 4_1), and the fifth row of X51-X54 corresponds to a fifth encoded data slice (EDS 5_1). Note that the second number of the EDS designation corresponds to the data segment number.

Returning to the discussion of FIG. 3, the computing device also creates a slice name (SN) for each encoded data slice (EDS) in the set of encoded data slices. A typical format for a slice name 60 is shown in FIG. 6. As shown, the slice name (SN) 60 includes a pillar number of the encoded data slice (e.g., one of 1-T), a data segment number (e.g., one of 1-Y), a vault identifier (ID), a data object identifier (ID), and may further include revision level information of the encoded data slices. The slice name functions as, at least part of, a DSN address for the encoded data slice for storage and retrieval from the DSN memory 22.

As a result of encoding, the computing device 12 or 16 produces a plurality of sets of encoded data slices, which are provided with their respective slice names to the storage units for storage. As shown, the first set of encoded data slices includes EDS 1_1 through EDS 5_1 and the first set of slice names includes SN 1_1 through SN 5_1 and the last set of encoded data slices includes EDS 1_Y through EDS 5_Y and the last set of slice names includes SN 1_Y through SN 5_Y.

FIG. 7 is a schematic block diagram of an example of dispersed storage error decoding of a data object that was dispersed storage error encoded and stored in the example of FIG. 4. In this example, the computing device 12 or 16 retrieves from the storage units at least the decode threshold number of encoded data slices per data segment. As a specific example, the computing device retrieves a read threshold number of encoded data slices.

Figure 8:
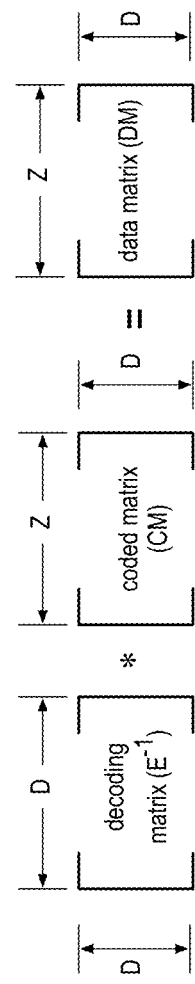
FIG. 8 is a schematic block diagram of a generic example of an error decoding function in accordance with the present invention.

To recover a data segment from a decode threshold number of encoded data slices, the computing device uses a decoding function as shown in FIG. 8. As shown, the decoding function is essentially an inverse of the encoding function of FIG. 4. The coded matrix includes a decode threshold number of rows (e.g., three in this example) and the decoding matrix in an inversion of the encoding matrix that includes the corresponding rows of the coded matrix. For example, if the coded matrix includes rows 1, 2, and 4, the encoding matrix is reduced to rows 1, 2, and 4, and then inverted to produce the decoding matrix.

Figure 9:
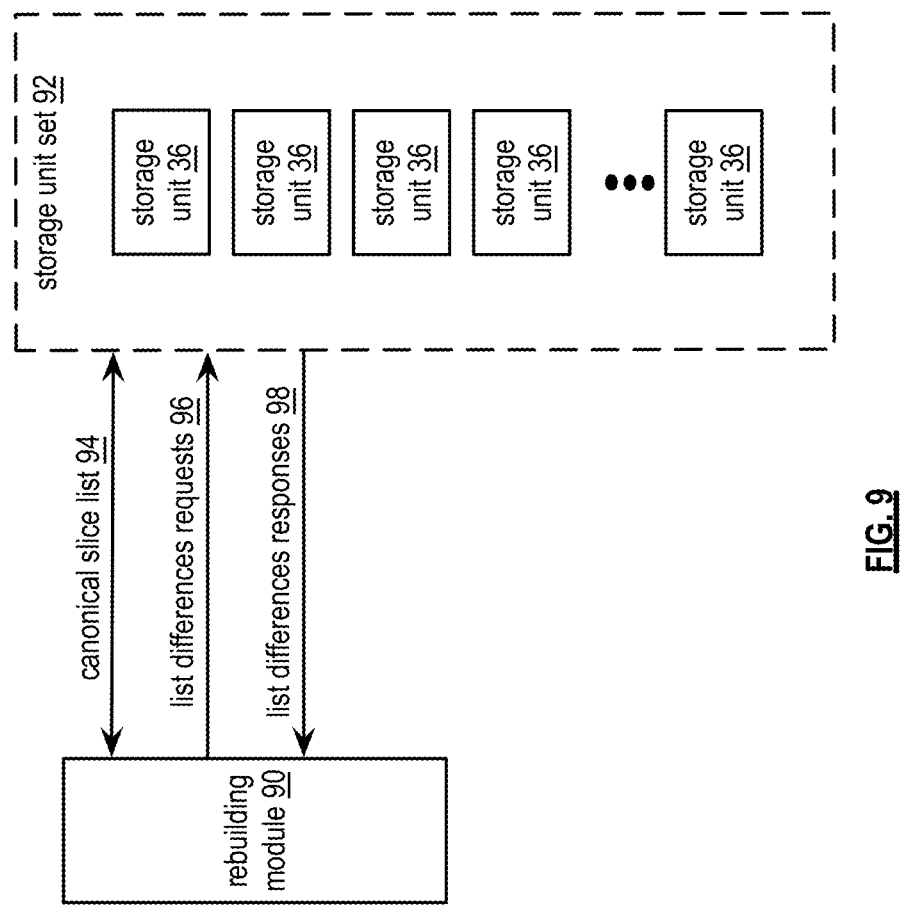
FIG. 9 is a schematic block diagram of another embodiment of a dispersed storage network (DSN) in accordance with the present invention.

FIG. 9 is a schematic block diagram of another embodiment of a dispersed storage network (DSN) system that includes one or more rebuilding modules 90 and a storage unit set 92. The storage unit set 92 includes a group of storage units, where one or more storage units 36 of the storage unit set may include another rebuilding module capable to rebuild slices associated with storage errors. As such, the system includes one or more rebuilding modules. The one or more rebuilding modules periodically agree upon some current set of storage slice names and revisions to create a canonical slice list 94 for some point in time, where the list of slice names is associated with a DSN address range for the storage unit set. For example, the rebuilding modules sent list requests to the storage unit set and receive list responses that indicate the current set of storage slices names. From time to time, the canonical slice list 94 is updated and distributed amongst the rebuilding modules (e.g., amongst the rebuilding module and the set of storage units).

In an example of rebuilding operations to detect storage errors, a rebuilding module updates the canonical slice list by obtaining a previous canonical slice list, issuing a set of list slice requests to the set of storage units, receiving a list slice responses, comparing the list slice responses, and updating the canonical slice list based on the comparison. For example, the comparison is utilized to produce a majority vote of slice names and associated revision numbers to update the canonical list. The rebuilding module 90 sends the canonical slice list 94 to each storage unit 36 of the storage unit set 92.

The rebuilding module 90 issues a list differences request 96 to at least one storage unit 36 of the set of storage units 92. The issuing includes generating the list differences request and sending the list differences request. The generating includes selecting a DSN address range based on at least one of a schedule, receiving an error message, receiving a request, and a predetermination. The generating further includes selecting the at least one storage unit of the set of storage units based on at least one of a schedule, receiving an error message, receiving a request, and a predetermination. The list differences request includes the DSN address range and may include the canonical slice list (e.g., when the one or more storage units do not have an updated version of the canonical slice list).

Each storage unit of the at least one storage unit compares the canonical slice list to a current slice list associated with the storage unit to identify differences. The storage unit generates a list differences response 98 based on the comparison to identify any of additional slices and revisions held by the storage unit and missing slices and revisions associated with the storage unit. The storage unit sends the associated list differences response to the rebuilding module. The rebuilding module identifies potential storage errors of the storage unit based on the list differences response. For example, the rebuilding module identifies storage errors associated with missing slices and revisions associated with the storage unit.

Figure 10:
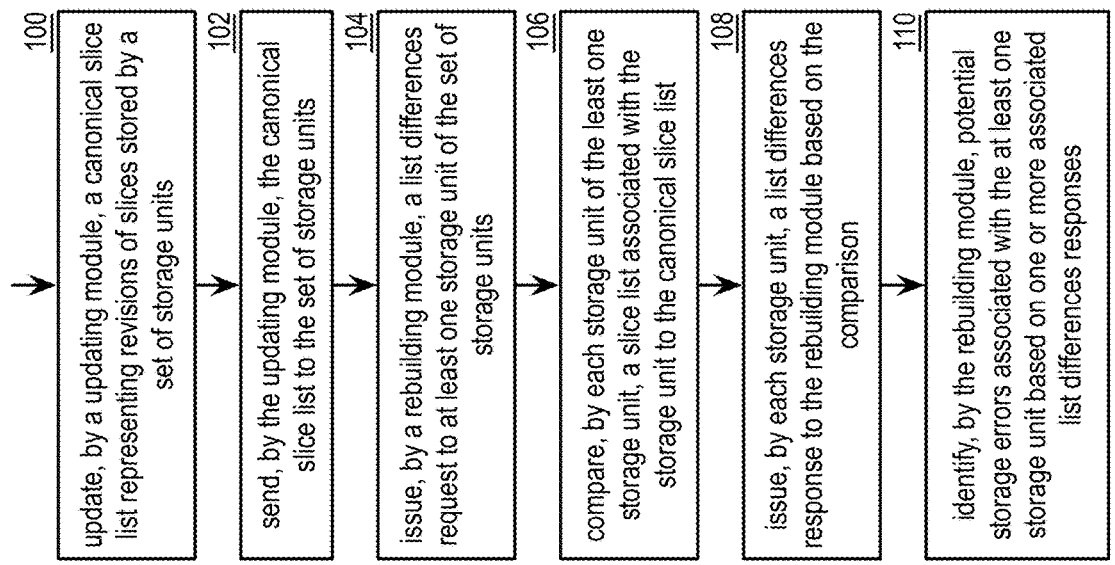
FIG. 10 is a flowchart illustrating an example of detecting storage errors in accordance with the present invention.

FIG. 10 is a flowchart illustrating an example of detecting storage errors. The method begins at step 100 where an updating module (e.g., a rebuilding module) updates a canonical slice list representing revisions of slices stored by a set of storage units. The method continues at step 102, where the updating module sends the canonical slice list of the set of storage units. The method continues at step 104, where the rebuilding module issues a list differences request to at least one storage unit of the set of storage units. The method continues at step 106, where each storage unit receiving a corresponding list differences request compares a slice list associated with the storage unit to the canonical slice list to identify any of missing revisions of slices and extra revisions of slices associated with the storage unit. The method continues at step 108, where the storage unit issues a list differences response to the rebuilding module based on the comparison. The method continues at step 110 where the rebuilding module identifies potential storage errors associated with the at least one storage unit based on one or more associated list differences responses.

Figure 11:
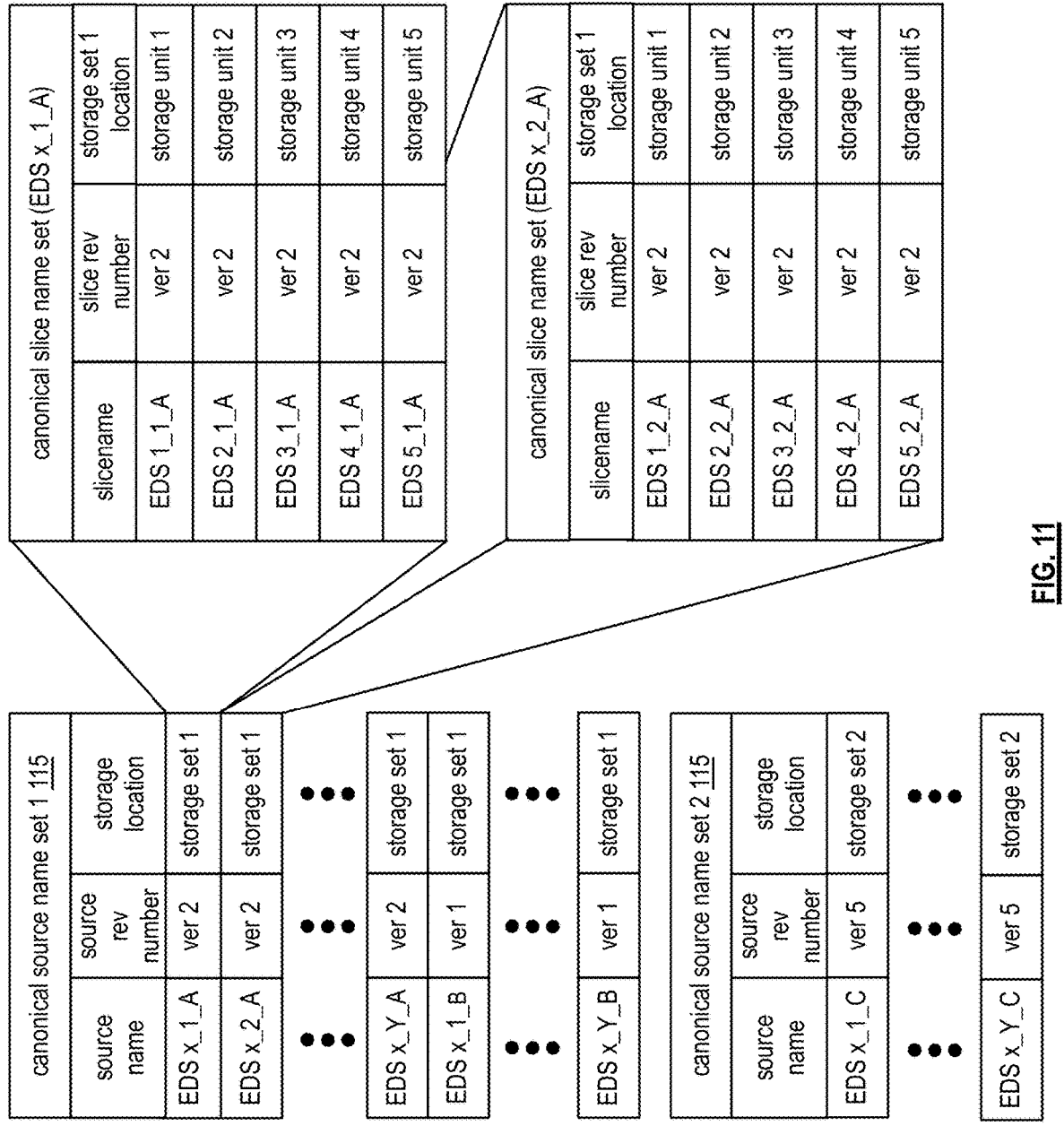
FIG. 11 is a schematic block diagram of an example of a canonical slice list in accordance with the present invention.

FIG. 11 is a schematic block diagram of an example of a canonical slice list. The canonical slice list may be referred to herein interchangeably as a common shared list. The canonical slice list includes a canonical source name set 1 115 and a canonical source name set 2 115. Each of the canonical source name set 1 115 and the canonical source name set 2 115 include a source name field, a source revision number field and a storage location field. For example, for source name EDS x_1_A, where x indicates any pillar number in a set of encoded data slices, the source revision is version 2 and the storage location is storage set 1 (e.g., a first set of storage units of the DSN). As another example, for source name EDS x_1_C the "x" indicates that for any pillar in the set of encoded data slices of data segment 1 of data object C, should include a source revision number of version 5 and a storage location of storage set 2 (e.g., a second set of storage units of the DSN).

The canonical slice list also may include canonical slice name sets relating to the canonical source name sets 1-2 115. For example, for source name EDS x_1_A, a canonical slice name set includes slice names EDS 1_1_A through 5_1_A for a first data segment of object A that has a pillar width number of 5. In an embodiment, the canonical slice name or source name sets are stored in one or more computing devices of the DSN and are stored in the set of storage units. In one example, a storage unit of the set of storage units stores a canonical source name set. In another example, the storage unit stores canonical slice names of the canonical slice name sets the storage unit is responsible for storing. The canonical slice lists are used with difference list requests to more efficiently (e.g., less throughput (e.g., difference list response includes less data than a list response)) determine storage errors (e.g., encoded data slice errors) in the DSN.

Figure 12:
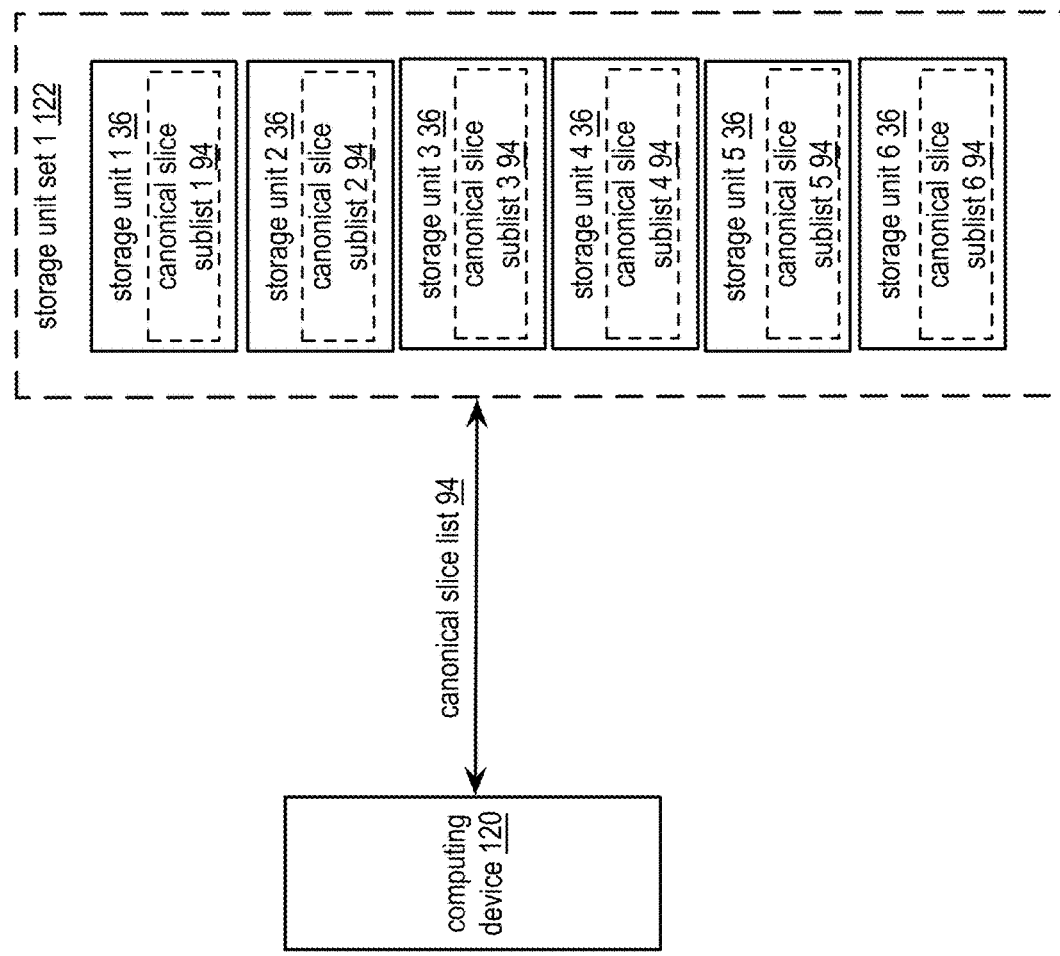
FIG. 12 is a schematic block diagram of an example of canonical slice sublists stored in a set of storage units of the DSN in accordance with the present invention.

FIG. 12 is a schematic block diagram of an example of canonical slice sublists 94 stored in a set of storage units 122 of the dispersed storage network (DSN). As illustrated, a computing device 120 of the DSN sends a canonical slice list 94 to a storage unit set 1 122. Each storage unit may store the entire canonical slice list 94 or may store a corresponding portion (e.g., sublist) of the canonical slice list 94. For example, a first storage unit 36 stores a canonical slice sublist 1 94, a second storage unit 94 stores a canonical slice sublist 2 94, and so on up to a sixth storage unit 94 stores a canonical slice sublist 6 94. Each of the canonical slice sublists 1-6 94 include an identification of encoded data slices that the corresponding storage unit is storing at a particular time. Note that the computing device may alternatively send a canonical source list for utilization of the storage units in responding to difference list requests. The difference list requests are discussed in further detail with reference to FIGS. 9-10, and 14-19.

Figure 13:
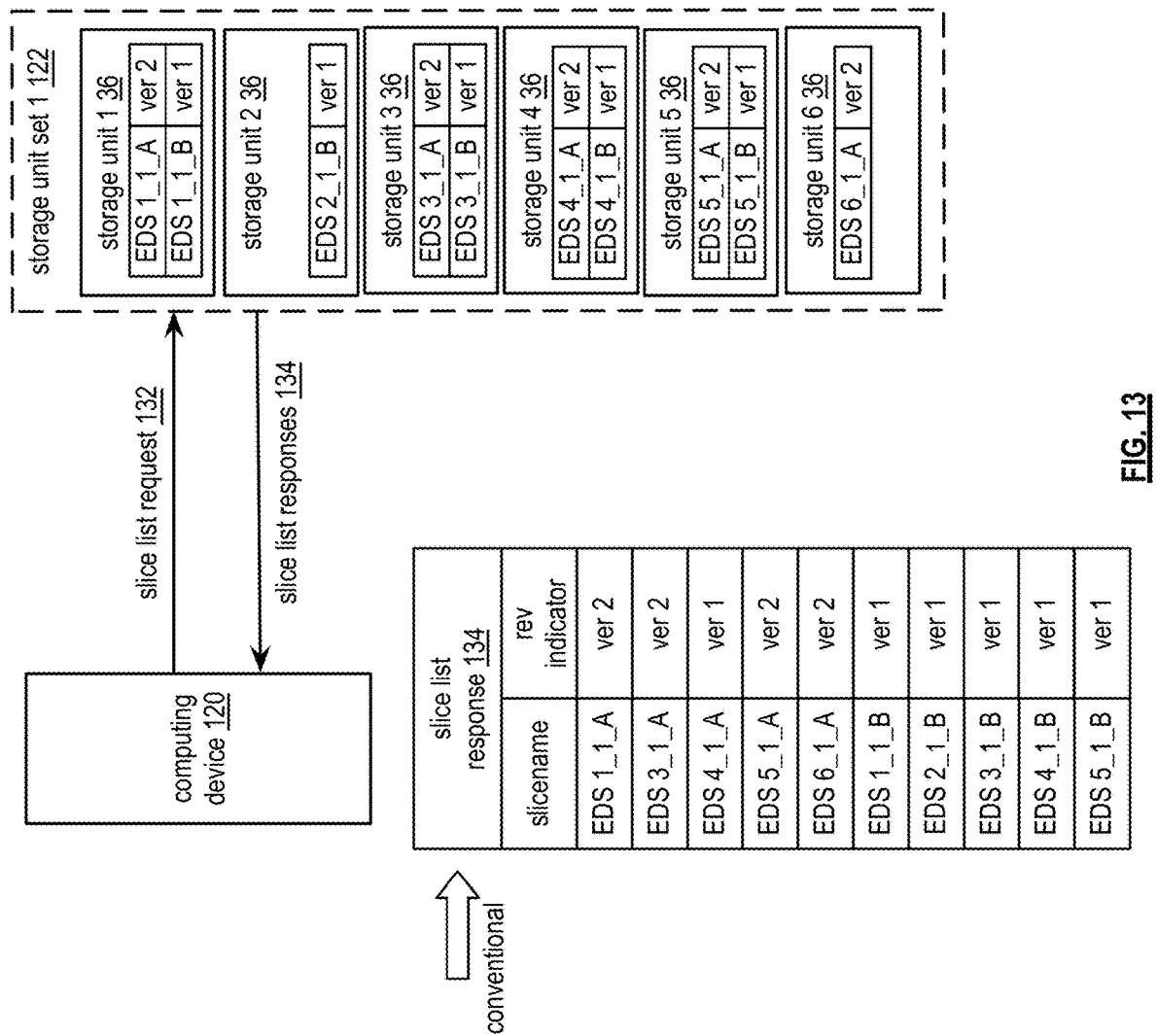
FIG. 13 is a schematic block diagram of an example of a conventional list response in accordance with the present invention.

FIG. 13 is a schematic block diagram of an example of a conventional list response in a dispersed storage network (DSN) that includes a computing device 120 and a storage unit set 122 that includes a plurality of storage units 36. The computing device 120 may be implemented by one of a computing device 12-16, a managing unit 18 and an integrity processing unit 20 of FIG. 1.

In an example of operation, the computing device 120 sends a slice list request 132 to the set of storage units. The slice list request 132 indicates to each storage unit 36 to respond with a list of encoded data slices (e.g., slicenames) the storage unit is storing. In this example, storage unit 1 is storing EDS 1_1_A and EDS 1_1_B, storage unit 2 is storing EDS 2_1_B, storage unit 3 is storing EDS 3_1_A and EDS 3_1_B, storage unit 4 is storing EDS 4_1_A and EDS 4_1_B, storage unit 5 is storing EDS 5_1_A and EDS 5_1_B, and storage unit 6 is storing EDS 6_1_A. In response to the slice list request 132, the storage units respond by sending a slice list response 134 to the computing device 120 indicating the encoded data slices stored and their corresponding version number. Thus, in one example, the slice list response 134 is large (e.g., includes information regarding all the encoded data slices stored) and includes data (e.g., at least some of the information regarding the encoded data slices) that the computing device does not need in order to determine whether a storage error exists.

Figure 14:
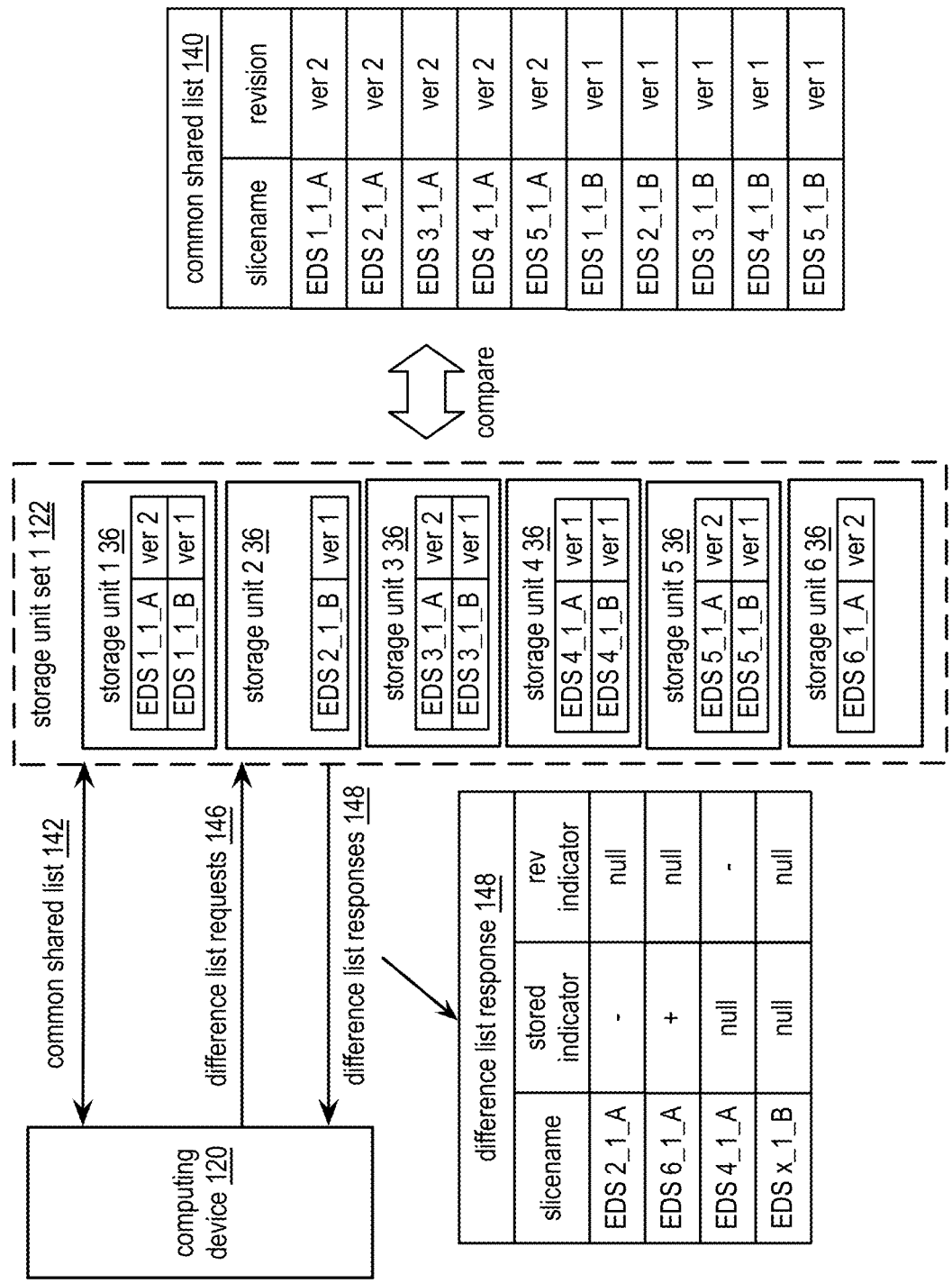
FIG. 14 is a schematic block diagram of an example of a difference list response in accordance with the present invention.

FIG. 14 is a schematic block diagram of an example of a difference list response in a dispersed storage network (DSN) that includes a computing device 120 and a storage unit set 1 122 that includes a plurality of storage units 36. The computing device 120 may be implemented by a computing device 12-16, a managing unit 18 and an integrity processing unit 20 of FIG. 1. The storage units 36 are operable to store encoded data slices. Note for ease of illustration and understating, the storage units are shown storing 1-2 encoded data slices. However, generally the storage units will store a substantially greater number of encoded data slices (e.g., thousands, millions, billions, etc.).

In this example, the computing device 120 sends a common shared list 142 to the storage unit set 122. The common shared list includes identities of encoded data slices (e.g., slice names, source names, DSN addresses, etc.) that should be stored in the set of storage units. For example, the common shared list is encoded data slices that are stored in the storage unit set 1 122 as agreed to by a consensus number of storage units and/or computing devices at a particular time. In one example, the common shared list also includes a corresponding revision level for each slice name or portion thereof (e.g., source name). Alternatively, or in addition to, the common shared list includes an identification of a storage unit corresponding to storage of each encoded data slice or source name.

In an example of operation, the computing device 120 sends a set of difference list requests 146 to the storage unit set 122. In an embodiment, the set of difference list requests includes at least a portion of the common shared list. The storage units 1-6 then compare the encoded data slices they are currently storing to the encoded data slices identified in a common shared list or portion thereof (e.g., sublist). When the comparison is favorable, the storage unit does not add the slice name to the difference list response. For example, when a slice name of an encoded data slice stored in the storage unit substantially matches a slice name of a corresponding encoded data slice stored in the common shared list, the storage unit does not add the slice name to the difference list response. As another example, when a revision number associated with a slice name of an encoded data slice stored in the storage unit substantially matches a revision number associated with a slice name of a corresponding encoded data slice stored in the common shared list, the storage unit does not add the slice name to the difference list response.

When the comparison is unfavorable, the storage unit adds the slice name to the difference list response. For example, when a slice name of an encoded data slice stored in the storage unit does not substantially match a slice name of a corresponding encoded data slice stored in the common shared list (e.g., the slice name of the encoded data slice is not in the common shared list), the storage unit adds the slice name to the difference list response. In one example, the storage unit only adds the slice name of the encoded data slice to the difference list response. In another example, the storage unit adds the slice name with an indication of "+" when the encoded data slice is stored in the storage unit but not included in the common shared list or with an indication of "−" when the encoded data slices is not stored in the storage unit but is included in the common shared list. As another example, when a revision number associated with a slice name of an encoded data slice stored in the storage unit does not substantially match a revision number associated with a slice name of a corresponding encoded data slice included in the common shared list, the storage unit adds the slice name to the difference list response.

As a specific example of a favorable comparison, the storage unit 1 is storing encoded data slices EDS 1_1_A that has a second revision level (e.g., version number 2) and EDS 1_1_B that is a version 1. The common shared list 140 indicates that EDS 1_1_A should be stored as a second version and EDS 1_1_B should be stored as a first version.

Thus, the storage unit determines there is no difference between its stored encoded data slices and their revision levels and the common shared list. Thus, the storage unit responds to the difference list request to indicate all stored encoded data slices match the common shared list. For example, the storage unit sends a difference list response that is empty (e.g., a null response (e.g., EDS x_1_B, null stored indicator, null revision indicator)). In another example, the storage unit does not respond, the computing device determines that all stored encoded data slices match the common shared list.

As a specific example of an unfavorable comparison, storage unit 2 is storing encoded data slice EDS 2_1_B in a first version. The storage unit 2 compares this to the common shared list 140 and determines that EDS 2_1_A should be stored in the storage unit 2 but is not. Thus, the storage unit responds to the difference list request to indicate the difference between its stored encoded data slices and the common shared list 140. For example, the storage unit sends a difference list response 148 to the computing device that includes an identifier of the encoded data slice (e.g., EDS 2_1_A) and a stored indicator (e.g. "−") to indicate the encoded data slice 2_1_A of the common shared list is not stored in storage unit 2. As another specific example of the unfavorable comparison, storage unit 6 is storing EDS 6_1_A version 2. Storage unit 6 compares the encoded data slices it is storing to the common slice list and determines a difference in that EDS 6_1_A is not listed in the common shared list. The storage unit sends a difference list response to the computing device indicating it is storing encoded data slice EDS 6_1_A that is not listed in the common shared list by including a "+" in the stored indicator (e.g., a binary 1 of a certain number of bits of the difference response).

As another specific example of the unfavorable comparison, storage unit 4 is storing encoded data slice EDS 4_1_A version 1 and encoded data slice EDS 4_1_B version 1. The storage unit compares the stored encoded data slice to the common shared list and determines there is no difference for EDS 4_1_B but there is a difference for EDS 4_1_A as the revision number of the stored EDS is version 1 and the revision number of the common slice list is version 2. Thus, the storage unit adds the slice name (or other identifier) of the encoded data slice EDS 4_1_A to the difference list response with an indicator that the revision level is different (e.g., "−").

Figure 15:
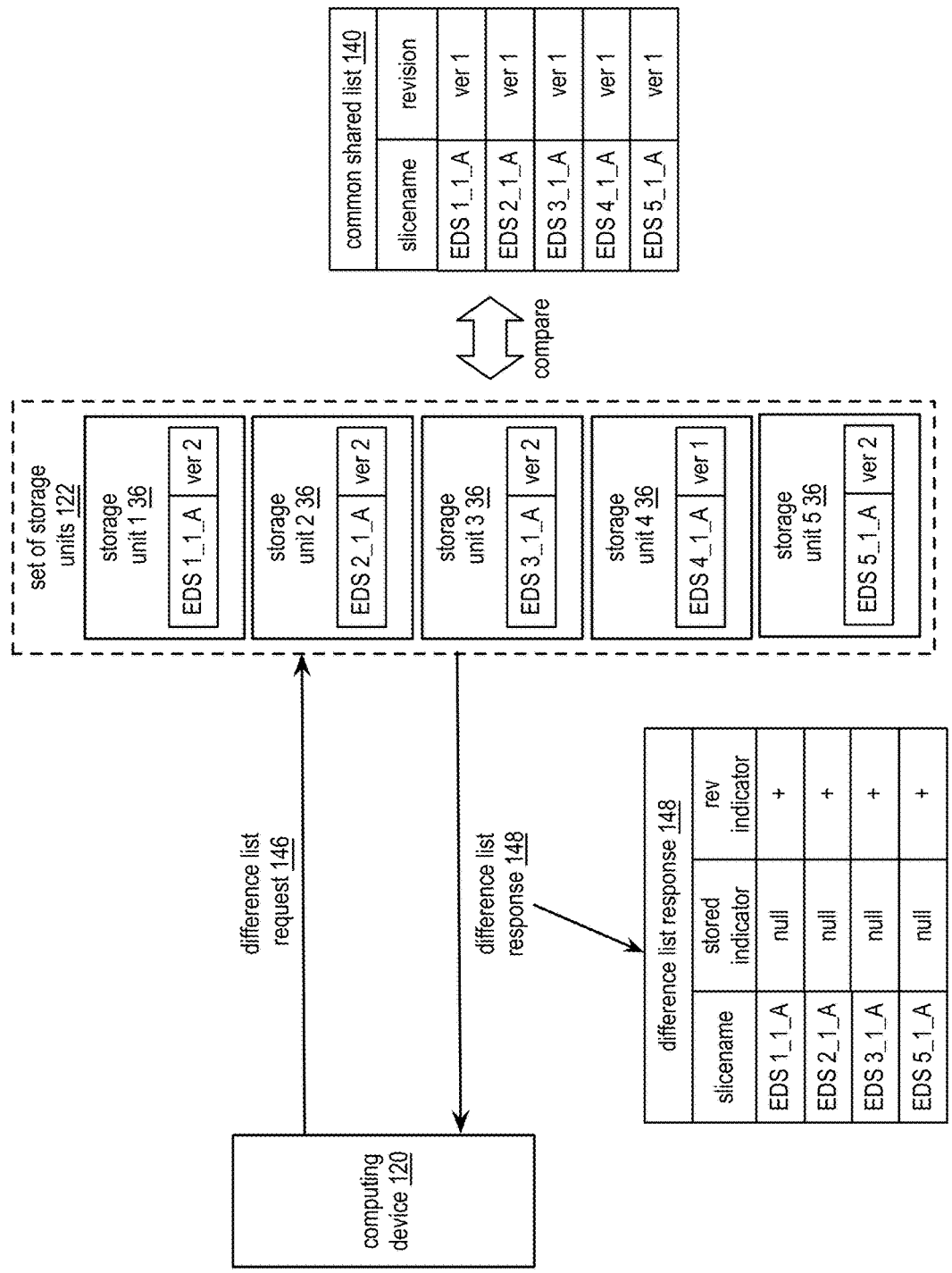
FIG. 15 is a schematic block diagram of another example of a difference list response in accordance with the present invention.

FIG. 15 is a schematic block diagram of another example of a difference list response in a dispersed storage network (DSN) that includes a computing device 120 and a storage unit set 122 that includes a plurality of storage units 36. The computing device 120 may be implemented by a computing device 12-16, a managing unit 18 and an integrity processing unit 20 of FIG. 1.

In this specific example, the computing device 120 sends a difference list request 146 to the set of storage units. The storage units compare identifiers of encoded data slices to a common shared list 140 to determine whether there are any differences between the encoded data slices that are stored and the encoded data slices listed in the common shared list 140. In this example, storage unit 4 compares EDS 4_1_A version 1 to the common shared list 140 and determines the identifiers (e.g., slicename, storage indicator, revision level, etc.) are substantially the same as identifiers of the common shared list. Having determined no differences, the storage unit 4 sends a message indicating all encoded data slices it is storing match the common shared list 140.

Storage units 1, 2, 3, and 5 compare the respective encoded data slices they are storing to the common shared list 140 and determine that a revision indicator of the stored encoded data slices are a version greater than the revision indicator listed in the common shared list. As such, the storage units 1, 2, 3, and 5 add identities of encoded data slices 1_1_A, 2_1_A, 3_1_A, and 5_1_A a difference list response that is sent to the computing device. Note in one example each storage unit independently sends a difference list response to the computing device and in another example the storage unit may sent its difference list response and the difference list response of another storage unit of the set of storage units to the computing device.

Figure 16:
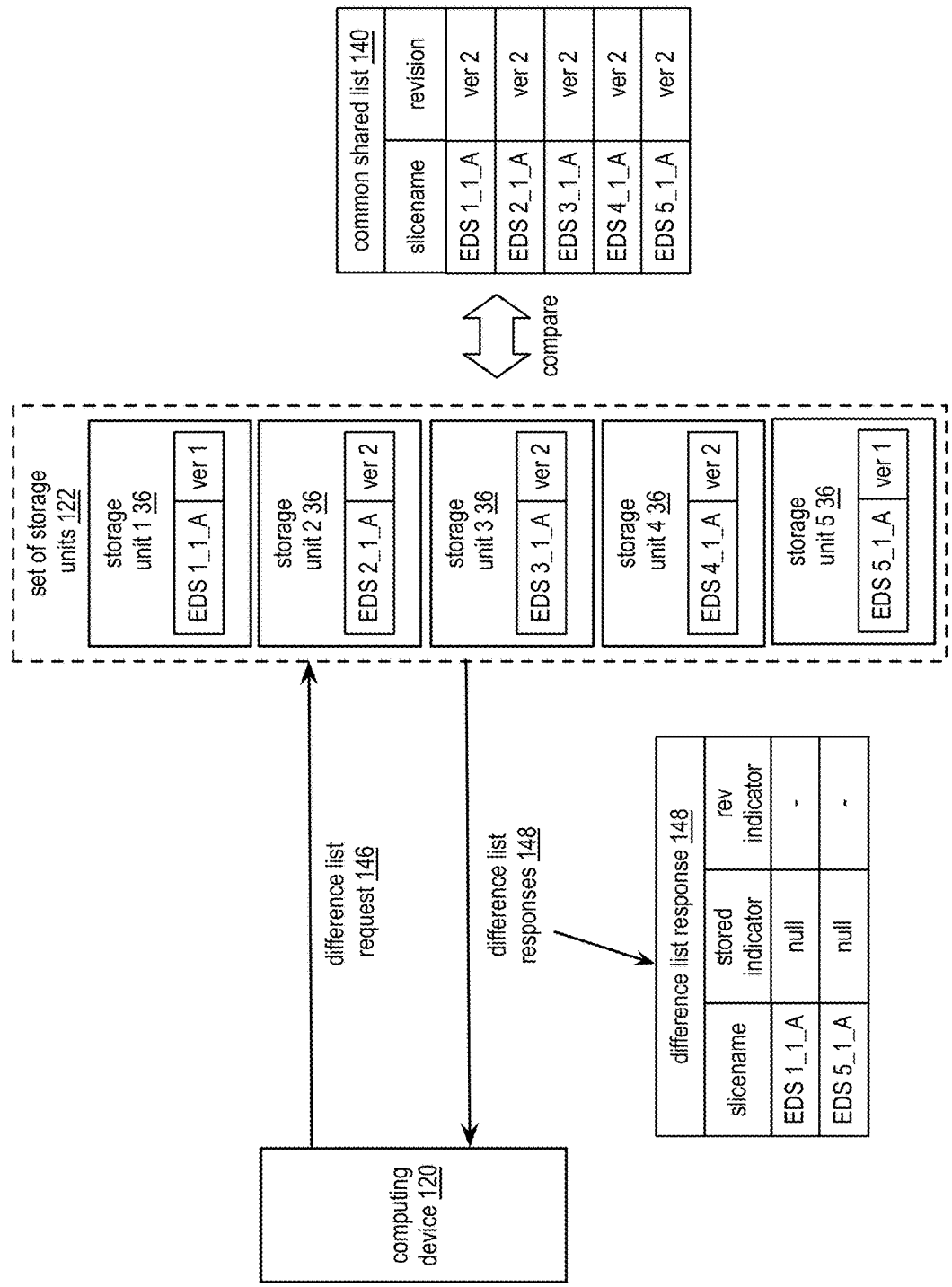
FIG. 16 is a schematic block diagram of another example of a difference list response in accordance with the present invention.

FIG. 16 is a schematic block diagram of another example of a difference list response in a dispersed storage network (DSN) that includes a computing device 120 and a set of storage unit 122 of the DSN that includes a plurality of storage units 36. The computing device 120 may be implemented by a computing device 12-16, a managing unit 18 and an integrity processing unit 20 of FIG. 1.

In this specific example, the computing device 120 sends a difference list request 146 to the set of storage units 122. The storage units 36 compare identifiers of encoded data slices to a common shared list 140 to determine whether there are any differences between the encoded data slices that are stored and the encoded data slices listed in the common shared list 140. In this example, storage units 2, 3 and 4 compares encoded data slices EDS 2_1_A, EDS 3_1_A and EDS 4_1_A version 2 to the common shared list 140 and determines the identifiers (e.g., slicename, storage indicator, revision level, etc.) are substantially the same as identifiers of encoded data slices EDS 2_1_A, EDS 3_1_A and EDS 4_1_A of the common shared list (e.g., both stored and version 2). Having determined no differences, the storage units 2, 3 and 4 each do not send a difference list response for encoded data slices EDS 2_1_A, EDS 3_1_A and EDS 4_1_A of the set of encoded data slices (e.g., EDS 1_1_A though EDS 5_1_A). Note that storage units 2, 3 and 4 may send difference list responses for other encoded data slices of other sets of encoded data slices that are not shown in this example.

Storage units 1 and 5 compare the respective encoded data slices they are storing to the common shared list 140 and determine that a revision indicator of the stored encoded data slices are a version less than the revision indicator listed in the common shared list. As such, the storage units 1 and 5 add identities of encoded data slices 1_1_A and 5_1_A to a difference list response 148 with a revision indicator of "−" (e.g., a binary 2 of a second certain number of bits of the difference response).

Figure 17:
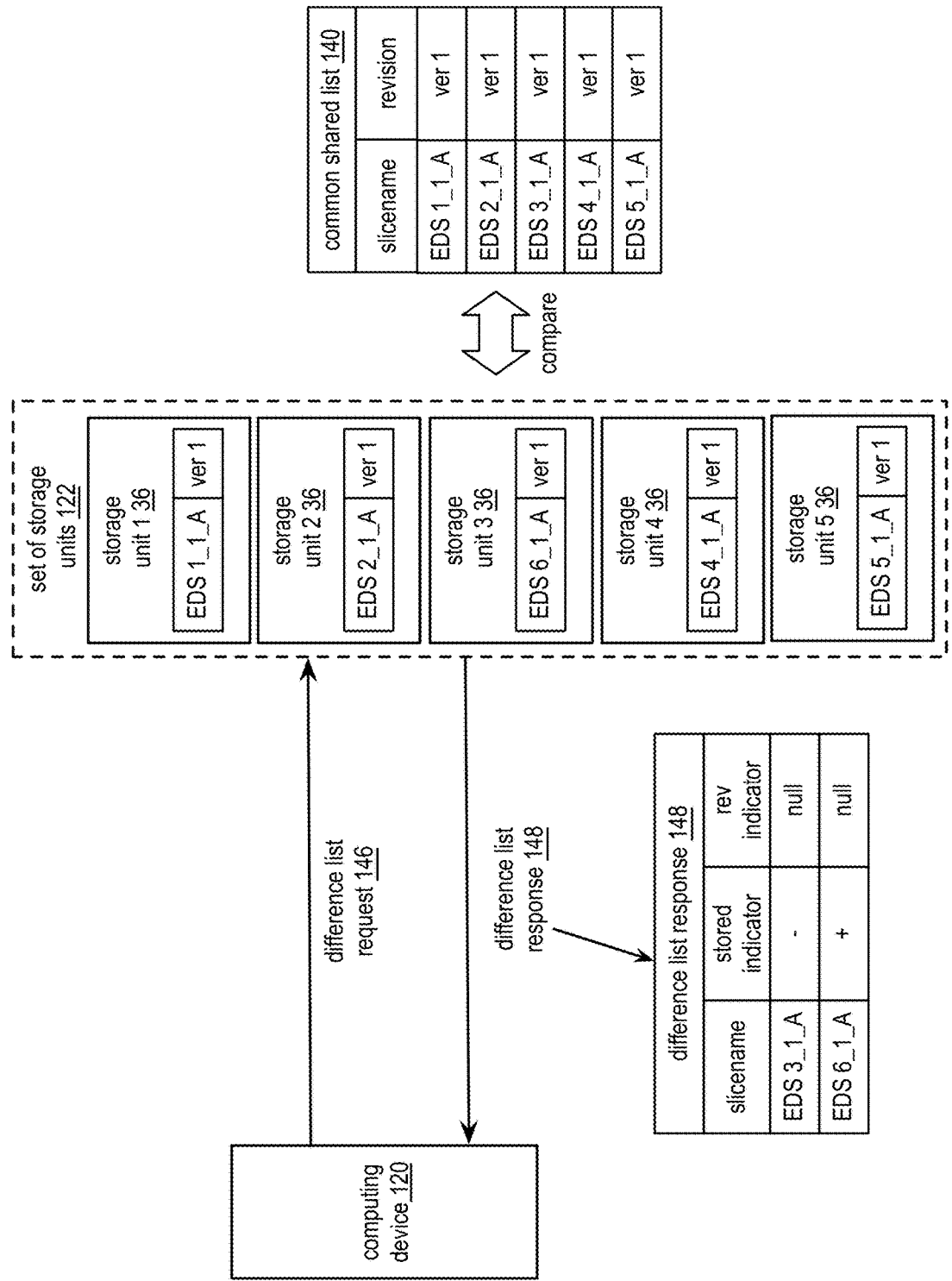
FIG. 17 is a schematic block diagram of another example of a difference list response in accordance with the present invention.

FIG. 17 is a schematic block diagram of another example of a difference list response in a dispersed storage network (DSN) that includes a computing device 120 and a storage unit set 122 of the DSN that includes a plurality of storage units 36. The computing device 120 may be implemented by a computing device 12-16, a managing unit 18 and an integrity processing unit 20 of FIG. 1.

In this example, the computing device sends a difference list request 146 to the set of storage units 122. The storage units determine that storage unit 3 is storing encoded data slice 6_1_A that is not included in a common shared list 140. The storage units further determine that storage unit 3 is not storing encoded data slice EDS 3_1_A that is included in the common shared list 140. The storage units still further determine that storage units 1, 2, 4, and 5 have no differences between identities of stored encoded data slices and the common shared list 140. As such the storage units (e.g., storage unit 3) send a difference list response 148 to the computing device 120 which indicates storage of EDS 3_1_A and EDS 6_1_A.

Figure 18:
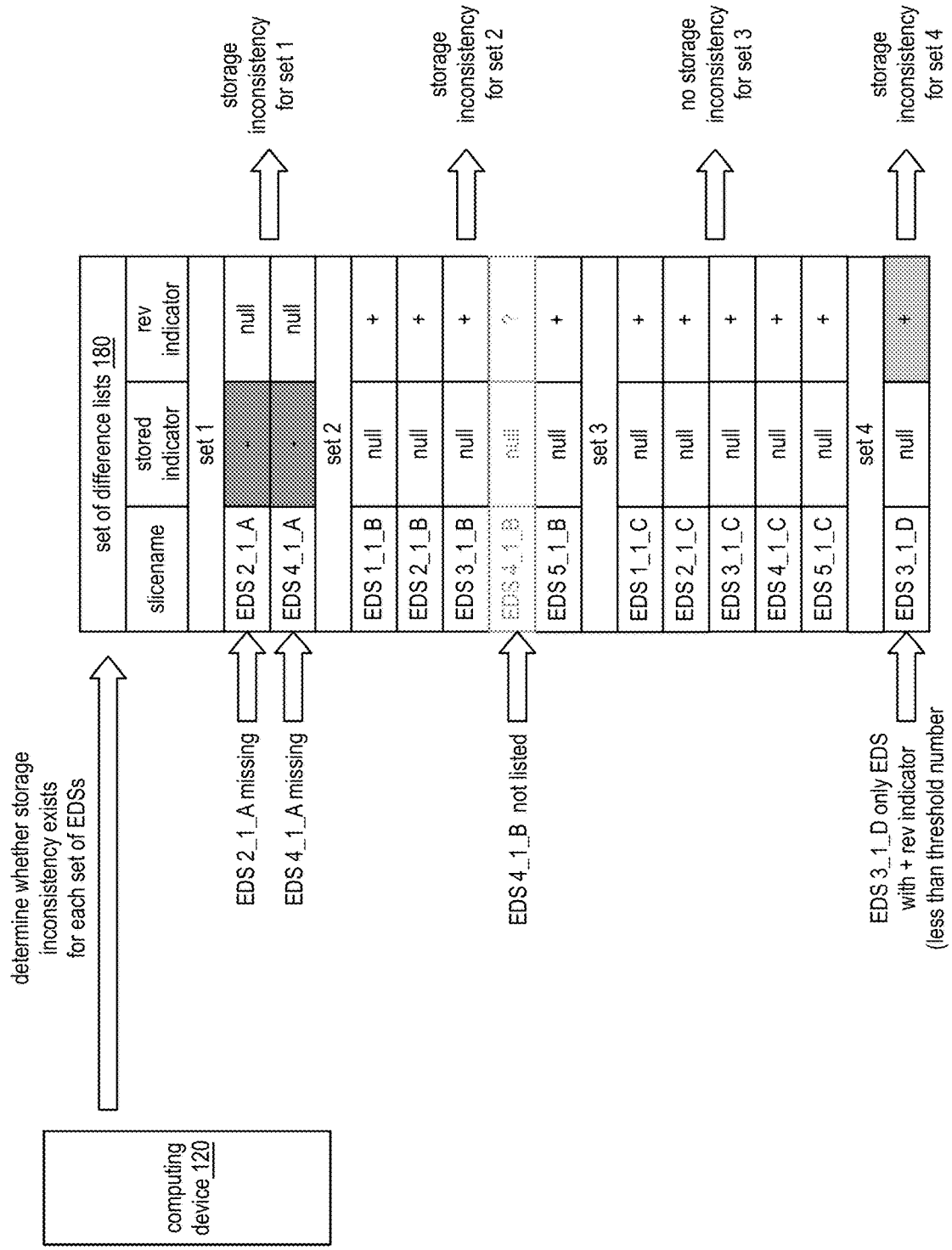
FIG. 18 is a schematic block diagram of an example of determining a storage inconsistency of one or more sets of encoded data slices in accordance with the present invention.

FIG. 18 is a schematic block diagram of an example of determining a storage inconsistency of one or more sets of encoded data slices in a dispersed storage network (DSN). that includes a computing device 120. The computing device may be implemented by a computing device 12-16, a managing unit 18 and an integrity processing unit 20 of FIG. 1.

In an example of operation, the computing device receives difference lists from storage units of the DSN. The computing device then aggregates the respective difference lists to produce one or more sets of difference lists 180. In one embodiment, the computing device arranges the difference lists by encoded data slices identified for a respective set of encoded data slices. For example, the set of difference lists 180 are arranged into sets 1-4 which represents sets of encoded data slices corresponding to data segment 1 of object A, data segment 1 of data object B, data segment 1 of data object C, and data segment 1 of data object D. Note in this example the storage units are to store a pillar width number of 5 encoded data slices per set of encoded data slices and a decode threshold number of encoded data slices of the set of encoded data slices needed to reconstruct a corresponding data segment is 3.

The computing device determines whether there is a storage inconsistency for each set of encoded data slices that has a corresponding encoded data slice listed in a difference list response 148. As a first example of determining whether a storage inconsistency exists, the computing device compares, for the first set of encoded data slices (e.g., EDS 1_1_A through EDS 5_1_A), stored indicators and revision indicators of the encoded data slices identified in the set of difference lists. When a storage indicator of an encoded data slice of the first set of encoded data slice indicates a difference (e.g., includes a "+" or a "−") the computing device determines the inconsistency exists for set 1 (e.g., encoded data slices associated with data segment 1 of object A). For instance, the set of difference lists indicates EDS 2_1_A and EDS 4_1_A are not stored in one or more of a desired storage unit (e.g., as identified in the common shared list), a set of storage units and a storage pool. The computing device may also compare the encoded data slices identified as inconsistent to the set of encoded data slices listed in the common shared list to determine one or more resolutions to the inconsistency.

In a first resolution, the computing device determines to flag the encoded data slices identified as inconsistent for rebuilding. In a second resolution, the computing device determines to rebuild the encoded data slices. In a third resolution, the computing device determines to adjust a threshold number (e.g., pillar width, write, read, decode) of a dispersed data storage parameter. In a fourth resolution, the computing device determines whether a copy of the encoded data slice exists in the DSN memory, and when the copy exists, copies the encoded data slice copy to reproduce the inconsistent encoded data slice. The computing device then sends the reproduced encoded data slice to a corresponding storage unit for storage therein.

As a second example of determining whether a storage inconsistency exists, the computing device compares, for the second set of encoded data slices (e.g., set 2), stored indicators and revision indicators of the encoded data slices identified in the set of difference lists. For set 2 (e.g., EDS 1_1_B through EDS 5_1_B) the computing device determines that every encoded data slice identified in a list difference response for the set 2 indicates proper storage (e.g., null). The computing device also determines for set 2 that all the revision indicators match (e.g. all are "+"). The computing device further determines that an encoded data slice of the set 2 is not listed (e.g., EDS 4_1_B) indicating that EDS 4_1_B is stored but is a different version than encoded data slices 1, 2, 3 and 5 of the set 2. Thus, the computing device determines a storage inconsistency for set 2.

In one embodiment, the computing device then determines a resolution to the inconsistency for set 2. For example, the computing device determines that the decode threshold is 3 and the number of encoded data slices that are consistent (e.g., substantially same stored indicators and revision indicators) is greater than the decode threshold. Thus, the computing device determines to flag the encoded data slice. The flag may indicate to rebuild a later time, to rebuild when another encoded data slice is flagged, or to rebuild when updating to a next consensus version. Alternatively, the computing device rebuilds the encoded data slice EDS 4_1_B. Still the computing device may send another list request to the storage unit that should be storing the encoded data slice EDS 4_1_B to determine a current storage status. The computing device may then determine a resolution or a flag type based on the current storage status.

As a third example of determining whether a storage inconsistency exists, the computing device compares, for the third set of encoded data slices (e.g., set 3), stored indicators and revision indicators of the encoded data slices identified in the set of difference lists. For set 3 (e.g., EDS 1_1_C through EDS 5_1_C) the computing device determines that every encoded data slice of set 3 is in a list difference response that indicates proper storage (e.g., null). The computing device also determines for set 3 that all the revision indicators match (e.g. all are "+"). Since all storage indicators match, all revision indicators match and all encoded data slices that should be stored for the set are listed, the computing device determines that for set 3, no inconsistencies exist. In one example, the computing device determines whether all encoded data slices for a set of encoded data slices are listed in the set of difference lists 180 by comparing the identities of encoded data slices to identities in a common stored list 140.

As a fourth example of determining whether a storage inconsistency exists, the computing device compares, for the fourth set of encoded data slices (e.g., set 4), stored indicators and revision indicators of the encoded data slices identified in the set of difference lists. For set 4 (e.g., EDS 1_1_D through EDS 5_1_D) the computing device determines that every encoded data slice of set 4 in a list difference response that indicates proper storage (e.g., null). The computing device also determines for set 3 that all the revision indicators match (e.g. all are "+"). However, the computing device also determines that less than a threshold number of encoded data slices is identified in the difference lists 180.

For instance, the computing device determines that one encoded data slice is identified, which is less than a decode threshold of 3. Thus, the computing device determines whether the storage error is with the encoded data slice identified or the encoded data slices not identified. For example, the computing device looks up the common shared list and determines that for the fourth set of encoded data slices, the version number should be 2, and the encoded data slice EDS 3_1_D is version 2, thus determines to update other encoded data slices of the set to version 2. As another example, the computing device looks up the common shared list and determines that for the fourth set of encoded data slices, the version number should be 1, and the encoded data slice EDS 3_1_D is version 2, thus determines to update encoded data slice EDS 3_1_D to version 1.

FIG. 19 is a flowchart illustrating an example of a method of determining a storage inconsistency for one or more sets of encoded data slices of a plurality of sets of encoded data slices in a dispersed storage network (DSN). The method begins or continues at step 190 where a computing device of the DSN sends a set of difference list requests to a set of storage units of the DSN.

The method continues at step 192, where the computing device receives a set of difference lists from the set of storage units of the DSN, where the set of storage units store the plurality of sets of encoded data slices. A first difference list of the set of difference lists is from a first storage unit of the set of storage units and identifies first encoded data slices of the plurality of sets of encoded data slices affiliated with the first storage unit that have first indicators that are different than corresponding first indicators of the first encoded data slices stored in a shared common list. A second difference list of the set of difference lists is from a second storage unit of the set of storage units and identifies second encoded data slices of the plurality of sets of encoded data slices affiliated with the second storage unit that have second indicators that are different than corresponding second indicators of the second encoded data slices stored in the shared common list.

The method continues with step 194, where the computing device determines, for a set of encoded data slices of the plurality of sets of encoded data slices, whether a storage inconsistency exists for an encoded data slice based on one or more indicators associated with the encoded data slice within the set of difference lists. The indicators include a storage indicator and/or a revision level indicator. As an example, the computing device determines a storage inconsistency exists by determining a storage indicator of the one or more indicators associated with the encoded data slice indicates that the encoded data slice is one of included in the common shared list as an encoded data slice that should be stored in a storage unit of the set of storage units and is not stored in the storage unit or is stored in the storage unit and is not included the common shared list as one of the encoded data slices that should be stored in the storage unit.

As another example, the computing device determines a storage inconsistency exists by determining a revision indicator of the one or more indicators associated with the encoded data slice indicates that the encoded data slice has a revision number that is different than revision numbers of other encoded data slices of the set of encoded data slices. As yet another example, the computing device determines a storage inconsistency exists by determining a revision indicator of the one or more indicators associated with the encoded data slice indicates that the encoded data slice has a revision number that is different than a revision number of the encoded data slice of the common shared list.

As yet a further example, the computing device determines a storage inconsistency exists when the number (e.g., storage threshold) of matching revision indicators for a set of encoded data slices is equal to or less than a threshold number (e.g., read, write, decode, pillar width). For example, a decode threshold is 3, a write threshold is 4 and a pillar width is 5. In one example, the storage threshold is 4. The computing device determines for a set of encoded data slices that 4 encoded data slices are identified in the set of difference lists with matching revision indicators. Thus, the storage threshold number of 4 is equal to the number of encoded data slices with matching revision indicators and the computing device determines an inconsistency.

When the storage inconsistency does not exist, the method continues back to step 190 or ends. When the storage inconsistency exists, the method continues with step 196, where the computing device flags for rebuilding encoded data slices of the set of encoded data slices associated with the storage inconsistency. The method continues to step 198, where the computing device rebuilds the flagged encoded data slices of the set of encoded data slices to resolve the inconsistency.

The method continues to step 200, where the computing device updates the common shared list based on the resolving the inconsistency. The method continues to step 202 where the computing device sends the updated common shared list to the set of storage units.

Note a computing device that includes memory, an interface, and a processing module is operable to perform any of the above methods and/or steps. Further note, a computer readable storage device that includes one or more memory elements that store operational instructions, that when executed by a computing device, causes the computing device to perform any of the above methods and/or steps.

It is noted that terminologies as may be used herein such as bit stream, stream, signal sequence, etc. (or their equivalents) have been used interchangeably to describe digital information whose content corresponds to any of a number of desired types (e.g., data, video, speech, audio, etc. any of which may generally be referred to as 'data').

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may also be used herein, the terms "processing module", "processing circuit", "processor", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, and/or any device that stores digital information. The memory device may be in a form a solid state memory, a hard drive memory, cloud memory, thumb drive, server memory, computing device memory, and/or other physical medium for storing digital information.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A method for execution by one or more computing devices of a storage network, the method comprises:
   determining a storage inconsistency exists for a set of encoded data slices based on a difference list, wherein the set of encoded data slices are stored or are to be stored in a set of storage units of the storage network, and wherein the difference list is generated by a storage unit of the set of storage units and includes an encoded data slice of the set of encoded data slices when a storage indicator of the encoded data slice of the difference list is different than a storage indicator for the encoded data slice included in a common shared list;
   determining a storage resolution of a plurality of storage resolutions for the storage inconsistency based on the indicator; and
   facilitating the storage resolution to resolve the storage inconsistency for the set of encoded data slices.

2. The method of claim 1, wherein the storage resolution comprises:
   determining to flag, for rebuilding, the encoded data slice of the set of encoded data slices identified as inconsistent.

3. The method of claim 2, wherein the flag indicates a time to rebuild the encoded data slice.

4. The method of claim 2, wherein the flag indicates to rebuild the encoded data slice when another encoded data slice of the set of encoded data slices is also flagged for rebuilding.

5. The method of claim 1, wherein the facilitating the storage resolution comprises:
retrieving a decode threshold number of encoded data slices of the set of encoded data slices, wherein the decode threshold number of encoded data slices does not include an encoded data slice of the set of encoded data slices associated with the storage inconsistency;
reconstructing the data segment from the decode threshold number of encoded data slices;
generating a consistent encoded data slice from the reconstructed data segment; and
sending the consistent encoded data slice to a corresponding storage unit of the set of storage units to resolve the storage inconsistency.

6. The method of claim 1, wherein the storage resolution comprises:
adjusting a dispersed storage error encoding parameter for the set of encoded data slices.

7. The method of claim 6, wherein the dispersed storage error encoding parameter is an encoding function.

8. The method of claim 6, wherein the dispersed storage error encoding parameter is a pillar width number of encoded data slices for the set of encoded data slices.

9. The method of claim 6, wherein the dispersed storage error encoding parameter is a decode threshold number of encoded data slices of the set of encoded data slices that are needed to reconstruct the data segment.

10. The method of claim 6, wherein the dispersed storage error encoding parameter includes a read threshold number of encoded data slices for the set of encoded data slices, wherein the read threshold number indicates a number of encoded data slices of the set of encoded data slices to be read from storage for decoding of the data segment.

11. The method of claim 6, wherein the dispersed storage error encoding parameter includes a write threshold number that indicates a number of encoded data slices for the set of encoded data slices to be stored such that the data segment is deemed to have been properly stored.

12. The method of claim 1, wherein the storage resolution comprises:
determining to rebuild an encoded data slice of the set of encoded data slices, wherein the encoded data slice is associated with the storage inconsistency.

13. The method of claim 1, wherein the storage resolution comprises:
determining whether a copy of an encoded data slice associated with the storage inconsistency exists in another set of storage units of the storage network: and
when the copy exists, copying the encoded data slice copy to reproduce the encoded data slice.

14. The method of claim 13 further comprises:
sending the reproduced encoded data slice to a corresponding storage unit of the set of storage units for storage therein.

15. The method of claim 1, wherein indicators of the difference list comprises:
a storage indicator for the encoded data slice that indicates storage status of the encoded data slice within a storage unit the set of storage units.

16. The method of claim 15, wherein the indicators of the difference list further comprises:
a revision indicator for the encoded data slice that indicates a revision level of the encoded data slice.

17. The method of claim 1 further comprises:
wherein the difference list does not include an identity of a second encoded data slice of the set of encoded data slices when a storage indicator of the second encoded data slice is the same as a corresponding storage indicator for the second encoded data slice of the common shared list.

18. The method of claim 1, wherein the storage inconsistency is a first encoded data slice of the set of encoded data slices having a different revision level than other encoded data slices of the set of encoded data slices, wherein the other encoded data slices include a decode threshold number of encoded data slices.

19. A computing device of a storage network, the computing device comprises:
memory;
an interface; and
a processing module operably coupled to the memory and the interface, wherein the processing module is operable to:
determine a storage inconsistency exists for a set of encoded data slices based on a difference list, wherein the set of encoded data slices are stored or are to be stored in a set of storage units of the storage network, and wherein the difference list is generated by a storage unit of the set of storage units and includes an encoded data slice of the set of encoded data slices when a storage indicator of the encoded data slice of the difference list is different than a storage indicator for the encoded data slice included in a common shared list;
determine a storage resolution of a plurality of storage resolutions for the storage inconsistency based on the indicator; and
facilitate the storage resolution to resolve the storage inconsistency for the set of encoded data slices.

20. The computing device of claim 19, wherein the storage resolution comprises:
determining to flag, for rebuilding, the encoded data slice of the set of encoded data slices associated with the storage inconsistency.

* * * * *